United States Patent
Hu

(10) Patent No.: US 12,202,734 B2
(45) Date of Patent: Jan. 21, 2025

(54) METHODS AND COMPOSITIONS FOR DIRECT, SIMULTANEOUS CONVERSION OF NITROGEN AND NATURAL GAS TO VALUE-ADDED COMPOUNDS

(71) Applicant: West Virginia University, Morgantown, WV (US)

(72) Inventor: Jianli Hu, Morgantown, WV (US)

(73) Assignee: West Virginia University Board of Governors on Behalf of West Virginia University, Morgantown, VA (US)

( * ) Notice: Subject to any disclaimer, the term of this patent is extended or adjusted under 35 U.S.C. 154(b) by 784 days.

(21) Appl. No.: 17/286,391

(22) PCT Filed: Oct. 29, 2019

(86) PCT No.: PCT/US2019/058454
§ 371 (c)(1),
(2) Date: Apr. 16, 2021

(87) PCT Pub. No.: WO2020/092299
PCT Pub. Date: May 7, 2020

(65) Prior Publication Data
US 2021/0238048 A1    Aug. 5, 2021

Related U.S. Application Data

(60) Provisional application No. 62/752,639, filed on Oct. 30, 2018.

(51) Int. Cl.
*C01C 1/04*    (2006.01)
*B01J 8/02*    (2006.01)
(Continued)

(52) U.S. Cl.
CPC ........... *C01C 1/0411* (2013.01); *B01J 8/0278* (2013.01); *B01J 8/0285* (2013.01); *B01J 8/1827* (2013.01);
(Continued)

(58) Field of Classification Search
CPC ... C01C 1/0411; C01C 1/0417; C01C 1/0494; C01C 1/04; C01B 32/162; C01B 3/025;
(Continued)

(56) References Cited

U.S. PATENT DOCUMENTS

| 6,002,059 A | 12/1999 | Hellring et al. |
| 6,063,355 A | 5/2000 | Fujimura et al. |

(Continued)

FOREIGN PATENT DOCUMENTS

| JP | 2016-190746 A | 11/2016 | |
| WO | WO-2012121366 A1 * | 9/2012 | ............... B01J 29/48 |
| WO | 2018/182551 A2 | 10/2018 | |

OTHER PUBLICATIONS

English translation of WO-2012121366-A1 Description (Year: 2012).*

(Continued)

*Primary Examiner* — Daniel Berns
*Assistant Examiner* — Zachary John Baum
(74) *Attorney, Agent, or Firm* — Thomas | Horstemeyer LLP.

(57) ABSTRACT

In one aspect, the disclosure relates to processes for production of ammonia and hydrogen under low reaction severity using as reactants nitrogen and at least one C1-C4 hydrocarbon, e.g., methane. The disclosed processes are carried out using a heterogeneous catalyst comprising a metal selected from Group 7, Group 8, Group 9, Group 10, Group 11, and combinations thereof; wherein the metal is present in an amount from about 0.1 wt % to about 20 wt % based on the total weight of the heterogeneous catalyst; and (Continued)

a metal oxide support. The processes can be carried out at about ambient pressure and at a heterogeneous catalyst temperature of from about 50° C. to about 250° C. This abstract is intended as a scanning tool for purposes of searching in the particular art and is not intended to be limiting of the present disclosure.

16 Claims, 16 Drawing Sheets

(51) Int. Cl.
| | |
|---|---|
| B01J 8/18 | (2006.01) |
| B01J 8/42 | (2006.01) |
| B01J 21/04 | (2006.01) |
| B01J 23/58 | (2006.01) |
| B01J 23/75 | (2006.01) |
| B01J 23/89 | (2006.01) |
| B01J 23/94 | (2006.01) |
| B01J 23/96 | (2006.01) |
| B01J 35/00 | (2024.01) |
| B01J 37/18 | (2006.01) |
| B01J 38/12 | (2006.01) |
| C01B 3/02 | (2006.01) |
| C01B 3/26 | (2006.01) |
| C01B 32/162 | (2017.01) |

(52) U.S. Cl.
CPC ............... *B01J 8/1836* (2013.01); *B01J 8/42* (2013.01); *B01J 21/04* (2013.01); *B01J 23/58* (2013.01); *B01J 23/75* (2013.01); *B01J 23/8946* (2013.01); *B01J 23/94* (2013.01); *B01J 23/96* (2013.01); *B01J 35/19* (2024.01); *B01J 37/18* (2013.01); *B01J 38/12* (2013.01); *C01B 3/025* (2013.01); *C01B 3/26* (2013.01); *C01B 32/162* (2017.08); *C01C 1/0417* (2013.01); *C01C 1/0494* (2013.01); *B01J 2208/025* (2013.01); *C01B 2203/0277* (2013.01); *C01B 2203/068* (2013.01); *C01B 2203/0855* (2013.01)

(58) Field of Classification Search
CPC .............. C01B 3/26; C01B 2203/0277; C01B 2203/068; C01B 2203/0855; B01J 8/0278; B01J 8/0285; B01J 8/1827; B01J 8/1836; B01J 8/42; B01J 21/04; B01J 23/58; B01J 23/75; B01J 23/8946; B01J 23/94; B01J 23/96; B01J 35/0006; B01J 37/18; B01J 38/12; B01J 2208/025; B01J 35/19; B82B 1/00
See application file for complete search history.

(56) References Cited

U.S. PATENT DOCUMENTS

| | | | |
|---|---|---|---|
| 6,592,723 B2 | 7/2003 | Cha | |
| 7,094,384 B1 | 8/2006 | Brandenburg | |
| 2002/0180306 A1* | 12/2002 | Hunt | H03H 3/0072 310/302 |
| 2004/0250921 A1* | 12/2004 | Yamaguchi | C23C 8/30 148/218 |
| 2012/0308467 A1 | 12/2012 | Carpenter et al. | |
| 2016/0361712 A1 | 12/2016 | Hosono et al. | |
| 2017/0190578 A1 | 7/2017 | Noyes | |
| 2020/0079656 A1* | 3/2020 | Hu | B01J 23/63 |

OTHER PUBLICATIONS

Liu, N., et al. Catalytic ammonia synthesis over Mo nitride/ZSM-5. ChemCatChem 2010, 2, 167-174. (Year: 2010).*

* cited by examiner

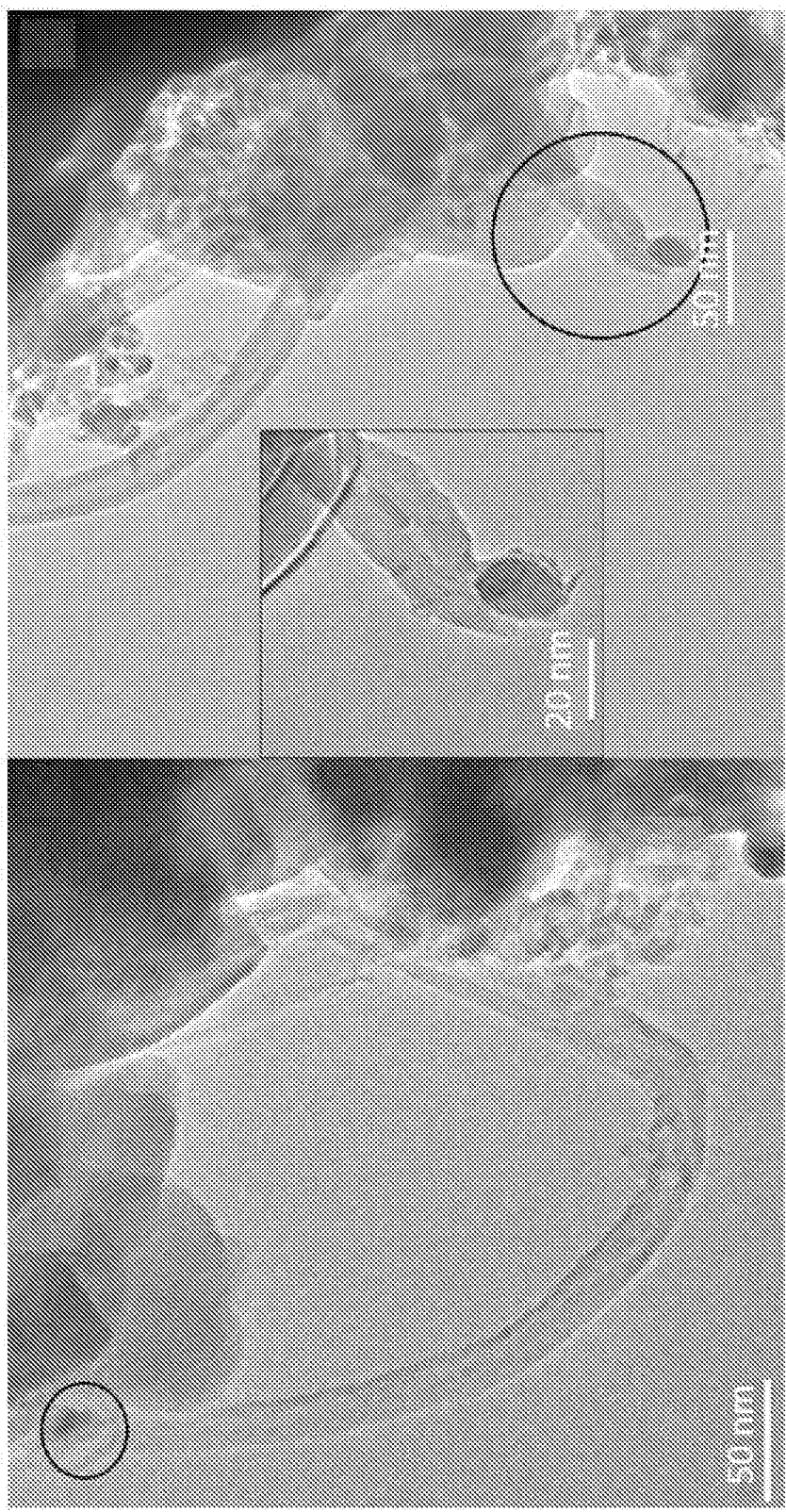

METHODS AND COMPOSITIONS FOR DIRECT, SIMULTANEOUS CONVERSION OF NITROGEN AND NATURAL GAS TO VALUE-ADDED COMPOUNDS

CROSS-REFERENCE TO RELATED APPLICATIONS

This application is the 35 U.S.C. § 371 national stage application of PCT Application No. PCT/US2019/058454, filed Oct. 29, 2019, where the PCT claims priority to, and the benefit of, U.S. Provisional Application No. 62/752,639, filed on Oct. 30, 2018, both of which are herein incorporated by reference in their entireties.

BACKGROUND

Ammonia ($NH_3$) is an extremely versatile and useful chemical for a variety of uses. One of the most important uses has been the use of ammonia to manufacture agricultural fertilizer. Ammonia has been manufactured since the early 20th century using the Haber-Bosch process. Previous attempts to synthesize ammonia from nitrogen and hydrogen had failed due to the thermodynamic problems until Haber and Bosch developed a process under high temperature and pressure that utilized an iron catalyst with a small amount of aluminum added. The process has achieved a single-pass-conversion of 15% (Renner, J. N.; Greenlee, L. F.; Ayres, K. E.; Herring, A. M. *Interface Mag.* 2015, 24 (2), 51). However, the Haber-Bosch process requires high temperature (400-570° C.) and high pressure (100-300 atm) in the reactor, which dramatically increase the capital and operating costs. For example, currently, it is almost impossible to build a new fossil fuel-ammonia plant due to the extremely high capital costs which can range up to 3 billion USD.

In industry, natural gas reforming (or coal gasification) is the main source of hydrogen ($H_2$). For instance, about 50% of the costs in an ammonia plant are associated with the hydrogen production from methane steam reforming. Direct natural gas conversion to value-added products without steam reforming could lead to huge economic impact. As a result, direct catalytic ammonia synthesis from $CH_4$ and $N_2$ is an attractive alternative to not only better utilize $CH_4$ but also produce $H_2$ as a valuable byproduct. However, almost no investigation about this process due to high chemical stability of $N_2$ and $CH_4$ molecules.

Despite advances in research for methods of ammonia synthesis, there remain a scarcity commercially viable alternatives to the Haber-Bosch method of ammonia synthesis. In particular, there are a lack of viable methods that utilize low pressure and moderate reaction temperatures, while at the same time not requiring a hydrogen source, e.g., hydrogen production via methane steam reforming. These needs and other needs are satisfied by the present disclosure.

SUMMARY

In accordance with the purpose(s) of the present disclosure, as embodied and broadly described herein, the disclosure, in one aspect, relates to methods of making ammonia and other value-added by-products, such as such as hydrogen, C2-C4 hydrocarbons, aromatics and carbon nanotubes, at relatively low pressure and moderate reaction temperature utilizing as reactants methane and nitrogen.

In various aspects, the present disclosure pertains to processes for the synthesis of ammonia, comprising: providing a reaction chamber with a heterogeneous catalyst; wherein the heterogeneous catalyst comprises a metal selected from Group 7, Group 8, Group 9, Group 10, Group 11, and combinations thereof; wherein the metal is present in an amount from about 0.1 wt % to about 20 wt % based on the total weight of the heterogeneous catalyst; and a metal oxide support; wherein the reaction chamber has a reaction pressure of about 2 torr to about 20 atm; conveying a flow of a reactant gas mixture into the reaction chamber via an entry port; wherein the reactant gas mixture comprises nitrogen and at least one C1-C4 hydrocarbon; contacting the reactant gas mixture with the heterogeneous catalyst; heating the heterogeneous catalyst using microwave energy, thereby providing a product gas mixture; and wherein the product gas mixture comprises ammonia, a C2-C4 hydrocarbons; and hydrogen; conveying the product gas mixture from the reaction chamber via an exit port. In some instances, the C2-C4 hydrocarbons can comprise a combination of one or more alkane, alkene, and acetylene, e.g., ethane, ethylene, acetylene, and combinations thereof.

In a further aspect, the present disclosure pertains to a product made by a disclosed process. In some aspects, the product is a product gas mixture; and wherein the product gas mixture comprises ammonia and hydrogen. In a further aspects, the product gas mixture further comprises at least one higher hydrocarbon, e.g., ethane, ethylene, acetylene, a mixture of olefins, benzene, toluene, xylene, and/or C9 or greater aromatic compounds. In a still further aspect, the product comprises at least one solid carbon material, which can form in contact with the heterogeneous catalyst. The product that is a solid carbon material can comprise carbon nanotubes, carbon fibers, graphene, or mixtures thereof.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A shows representative data for ammonia production versus time-on-stream in a disclosed process. As shown on the y-axis, production is given in $10^{-8}$ mol $NH_3$ per gram catalyst per second ($10^{-8}$ mol/g/s). FIG. 2B shows representative data for efficiency of methane conversion versus time-on-stream in a disclosed process.

FIGS. 3A-3B show representative transmission electron microscopy ("TEM") images of carbon nanotube formation on a spent disclosed catalyst, Co—Fe/γAl$_2$O$_3$. FIG. 3A shows a representative TEM image for base growth of carbon nanotubes on the spent catalyst. FIG. 3B shows a representative TEM image for tip growth of carbon nanotubes on the spent catalyst.

FIG. 8A shows TGA data for a Co/γAl$_2$O$_3$ catalyst in a reaction carried out under microwave irradiation only. FIG. 8B shows TGA data for a Co/γAl$_2$O$_3$ catalyst in a reaction carried out under microwave plasma. FIG. 8C shows TGA measurement of carbon formation via weight loss for a Co/γAl$_2$O$_3$ catalyst. The measurement was carried out under ambient pressure in 5% O$_2$ in Helium atmosphere.

FIG. 10A shows a representative TEM image the spent catalyst with coke deposit following a reaction carried out under microwave irradiation only. FIG. 10B shows a representative TEM image the spent catalyst with coke deposit following a reaction carried out under microwave plasma.

FIG. 11A shows formation of acetylene, ethylene, and ethane over time. FIG. 11B shows formation of ammonia over time.

FIG. 12A shows formation of acetylene, ethylene, and ethane over time. FIG. 12B shows formation of ammonia over time.

FIG. 13A shows formation of ammonia thermally pre-reduced at 280° C. followed by a second pre-reduction step at 180° C.; thermally pre-reduced at 280° C. only; thermally pre-reduced at 180° C. only, and pre-reduced under microwave heating at 280° C. FIG. 13B shows formation of ethylene under the same conditions described with respect to FIG. 13A. FIG. 13C shows formation of acetylene under the same conditions described with respect to FIG. 13A. FIG. 13D shows formation of ethane under the same conditions described with respect to FIG. 13A.

Figure 1:
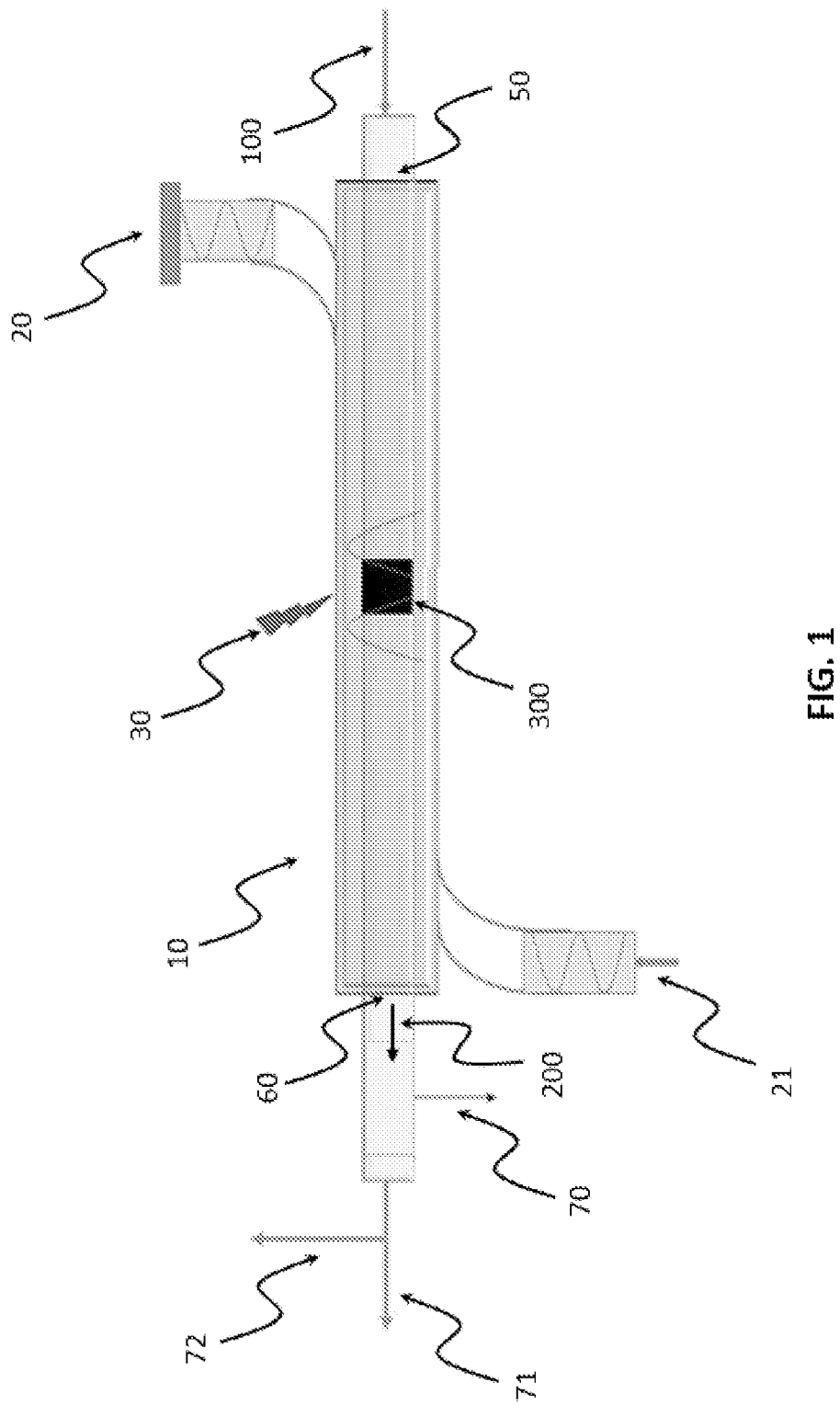
FIG. 1 shows a representative apparatus for carrying out a disclosed process for ammonia synthesis.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other aspects disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a metal oxide," "an inert gas," or "a catalyst," includes, but is not limited to, two or more such metal oxides, inert gases, or catalysts, and the like.

Moreover, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" heterogeneous catalyst is interpreted to include one or more heterogeneous catalyst molecules that may or may not be identical (e.g., different compositions of a heterogeneous catalyst within the scope of the present disclosure).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired improvement in the property modulated by the formulation component, e.g. achieving the desired level of modulus. Thus, for example, the specific level in terms of wt % of specific components in a heterogeneous catalyst composition required as an effective amount will depend upon a variety of factors including the amount and type of catalyst; composition of reactant gas mixture; amount, frequency and wattage of microwave energy that will be used during product; and production requirements in the use of the heterogeneous catalyst in preparing ammonia, one or more C2-C4 hydrocarbons; and hydrogen by the disclosed methods.

As used herein, "C2-C4 hydrocarbon" refers to a mixture comprising one or more C2, C3, and C4 hydrocarbon such as alkanes, alkenes, and alkynes, including, but not limited to, ethane, ethylene, and acetylene.

References in the specification and concluding claims to parts by weight of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein the terms "volume percent," "vol %," and "vol. %," which can be used interchangeably, indicate the percent by volume of a given gas based on the total volume at a given temperature and pressure, unless otherwise specified. That is, unless otherwise specified, all vol % values are based on the total volume of the composition. It should be understood that the sum of vol % values for all components in a disclosed composition or formulation are equal to 100.

As used herein, "carbon nanotubes," unless otherwise specified, refers to collectively to a variety of carbon nanotubes, including helical carbon nanotubes, multi-wall carbon nanotubes, double-wall carbon nanotubes and single-wall carbon nanotubes. It is to be understood that a material or composition referred to as carbon nanotubes can contain, unless otherwise specified, varying proportions of these sub-types of carbon nanotubes. In some aspects, the carbon nanotubes referred to comprise essentially all a particular sub-type, e.g., multi-wall carbon nanotubes.

As used herein, "carbon material" refers to carbon nanotubes, carbon fibers, carbon nanoparticles, amorphous carbon, pyrolytic carbon and soot in variable weight ratios.

Compounds are described using standard nomenclature. Unless defined otherwise, technical and scientific terms used herein have the same meaning as is commonly understood by one of skill in the art to which this disclosure belongs. For example, reference to Group 1, Group 2, and other atoms are in reference to IUPAC nomenclature as it applies to the periodic table. In particular, the group nomenclature used herein is that this is in accordance with that put forth in the IUPAC proposal was first circulated in 1985 for public comments (Pure Appl. Chem. IUPAC. 60 (3): 431-436. doi:10.1351/pac198860030431), and was later included as part of the 1990 edition of the Nomenclature of Inorganic Chemistry (Nomenclature of Inorganic Chemistry: Recommendations 1990. Blackwell Science, 1990. ISBN 0-632-02494-1).

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

B. Catalyst Compositions

In one aspect, the disclosure relates to heterogeneous catalysts comprising cobalt metal and a metal oxide. More specifically, in one aspect, the present disclosure relates to heterogeneous catalysts comprising: a metal selected from Group 7, Group 8, Group 9, Group 10, Group 11, or combinations thereof; wherein the metal is present in an amount from about 0.1 wt % to about 20 wt % based on the total weight of the heterogeneous catalyst; and a metal oxide support.

In a further aspect, disclosed are heterogeneous catalysts comprising: a metal selected from Group 7, Group 8, Group 9, Group 10, Group 11, or combinations thereof; wherein the metal is present in an amount from about 1 wt % to about 10 wt % based on the total weight of the heterogeneous catalyst; and a metal oxide support.

In various aspects, disclosed are heterogeneous catalysts comprising: cobalt in an amount from about 1 wt % to about 50 wt % based on the total weight of the heterogeneous catalyst; and a metal oxide support.

In various aspects, disclosed are heterogeneous catalysts comprising: cobalt in an amount from about 1 wt % to about 20 wt % based on the total weight of the heterogeneous catalyst; and a metal oxide support.

In a further aspect, disclosed are heterogeneous catalysts comprising: cobalt in an amount from about 1 wt % to about 10 wt % based on the total weight of the heterogeneous catalyst; and a metal oxide support.

In various aspects, disclosed are heterogeneous catalysts comprising: ruthenium in an amount from about 1 wt % to about 50 wt % based on the total weight of the heterogeneous catalyst; and a metal oxide support.

In various aspects, disclosed are heterogeneous catalysts comprising: ruthenium in an amount from about 1 wt % to about 20 wt % based on the total weight of the heterogeneous catalyst; and a metal oxide support.

In a further aspect, disclosed are heterogeneous catalysts comprising: ruthenium in an amount from about 1 wt % to about 10 wt % based on the total weight of the heterogeneous catalyst; and a metal oxide support.

In various aspects, disclosed are heterogeneous catalysts comprising: a mixture of cobalt and ruthenium in an amount from about 1 wt % to about 50 wt % based on the total weight of the heterogeneous catalyst; and a metal oxide support.

In various aspects, disclosed are heterogeneous catalysts comprising: a mixture of cobalt and ruthenium in an amount from about 1 wt % to about 20 wt % based on the total weight of the heterogeneous catalyst; and a metal oxide support.

In a further aspect, disclosed are heterogeneous catalysts comprising: a mixture of cobalt and ruthenium in an amount from about 1 wt % to about 10 wt % based on the total weight of the heterogeneous catalyst; and a metal oxide support.

In various aspects, disclosed are heterogeneous catalysts comprising: a metal selected from Group 7, Group 8, Group 9, Group 10, Group 11, or combinations thereof; wherein the metal is present in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In various aspects, disclosed are heterogeneous catalysts comprising: a metal selected from Group 7, Group 8, Group 9, Group 10, Group 11, or combinations thereof; wherein the metal is present in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In various aspects, disclosed are heterogeneous catalysts comprising: a metal selected from Group 7, Group 8, Group 9, Group 10, Group 11, or combinations thereof; wherein the metal is present in an amount from about 1 wt % to about 10 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In a further aspect, disclosed are heterogeneous catalysts comprising: ruthenium and/or cobalt (Co) in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In a further aspect, disclosed are heterogeneous catalysts comprising: ruthenium in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not ruthenium; and wherein when a combination of promoter materials is present, each is present in an amount independent of any other promoter material.

In a further aspect, disclosed are heterogeneous catalysts comprising: cobalt in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not cobalt; and wherein when a combination of promoter materials is present, each is present in an amount independent of any other promoter material.

In a further aspect, disclosed are mixed heterogeneous catalysts comprising: a first component comprising ruthenium in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material. The mixed heterogeneous catalysts can optionally further comprise a second component comprising cobalt in an amount from about 1 wt % to about 50 wt % based on the total weight of the heterogeneous catalyst and a metal oxide support. In a still further aspect, the first component of the mixed heterogeneous catalyst and the second component of the mixed heterogeneous catalyst can be present in any ratio from about 2:1 to about 1:2. In one aspect, the first component of the mixed heterogeneous catalyst and the second component of the mixed heterogeneous catalyst are present in a ratio of 1:1. In still another aspect, the first component and the second component are physically mixed.

In a further aspect, disclosed are mixed heterogeneous catalysts comprising: a first component comprising cobalt in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material. The mixed heterogeneous catalysts can optionally further comprise a second component comprising ruthenium in an amount from about 1 wt % to about 50 wt % based on the total weight of the heterogeneous catalyst and a metal oxide support. In a still further aspect, the first component of the mixed heterogeneous catalyst and the second component of the mixed heterogeneous catalyst can be present in any ratio from about 2:1 to about 1:2. In one aspect, the first component of the mixed heterogeneous catalyst and the second component of the mixed heterogeneous catalyst are present in a ratio of 1:1. In still another aspect, the first component and the second component are physically mixed.

In a further aspect, disclosed are mixed heterogeneous catalysts comprising: a first component comprising ruthenium in an amount from about 1 wt % to about 50 wt % based on the total weight of the heterogeneous catalyst; optionally comprising a second component comprising cobalt in an amount from about 1 wt % to about 50 wt % based on the total weight of the heterogeneous catalyst and a metal oxide support a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material. In a still further aspect, the first component of the mixed heterogeneous catalyst and the second component of the mixed heterogeneous catalyst can be present in any ratio from about 2:1 to about 1:2. In one aspect, the first component of the mixed heterogeneous catalyst and the second component of the mixed heterogeneous catalyst are present in a ratio of 1:1. In still another aspect, the first component and the second component are physically mixed.

In a further aspect, disclosed are heterogeneous catalysts comprising: ruthenium and/or cobalt (Co) in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In a further aspect, disclosed are heterogeneous catalysts comprising: ruthenium in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not ruthenium (Ru); and wherein when a combination of promoter materials is present, each is present in an amount independent of any other promoter material.

In a further aspect, disclosed are heterogeneous catalysts comprising: cobalt in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not cobalt; and wherein when a combination of promoter materials is present, each is present in an amount independent of any other promoter material.

In various aspects, disclosed are heterogeneous catalysts comprising: ruthenium and/or cobalt in an amount from about 1 wt % to about 10 wt % based on the total weight of the heterogeneous catalyst; optionally a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In various aspects, disclosed are heterogeneous catalysts comprising: ruthenium in an amount from about 1 wt % to about 10 wt % based on the total weight of the heterogeneous catalyst; optionally a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not ruthenium (Ru); and wherein when a combination of promoter materials is present, each is present in an amount independent of any other promoter material.

In various aspects, disclosed are heterogeneous catalysts comprising: cobalt in an amount from about 1 wt % to about 10 wt % based on the total weight of the heterogeneous catalyst; optionally a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not cobalt (Co); and wherein when a combination of promoter materials is present, each is present in an amount independent of any other promoter material.

In various aspects, disclosed are heterogeneous catalysts comprising: a first metal selected from Group 7, Group 8, Group 9, Group 10, Group 11, or combinations thereof; wherein the first metal is present in an amount from about 1 wt % to about 10 wt % based on the total weight of the heterogeneous catalyst; a second metal selected from Group 7, Group 8, Group 9, Group 10, Group 11, or combinations thereof; wherein the second metal is present in an amount from about 1 wt % to about 10 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the first or the second metal of the heterogeneous catalyst; and wherein when a combination of promoter materials is present, each is present in an amount independent of any other promoter material.

In various aspects, disclosed are heterogeneous catalysts comprising: ruthenium; wherein the ruthenium is present in an amount from about 1 wt % to about 10 wt % based on the total weight of the heterogeneous catalyst; optionally further comprise a second component comprising cobalt; wherein the cobalt, when present, is present in an amount from about 1 wt % to about 10 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not ruthenium and/or cobalt; and wherein when a combination of promoter materials is present, each is present in an amount independent of any other promoter material. In a still further aspect, the first component of the mixed heterogeneous catalyst and the second component, when present, of the mixed heterogeneous catalyst can be present in any ratio from about 2:1 to about 1:2. In one aspect, the first component of the mixed heterogeneous catalyst and the second component of the mixed heterogeneous catalyst are present in a ratio of 1:1. In still another aspect, the first component and the second component are physically mixed.

In various aspects, a disclosed catalyst composition can comprise mixtures of a disclosed catalyst composition, i.e., a heterogeneous catalyst mixture. For example, a disclosed catalyst composition can be a mixture of: (a) a first catalyst composition comprising ruthenium in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material; and (b) a second catalyst composition comprising cobalt in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter metal is selected from Group 1, Group 2, Group 7, Group 8, Group 9, Group 10, Group 11, and combinations thereof; wherein the promoter metal is not the same as the metal of the heterogeneous catalyst; and wherein when a combination of promoter materials is present, each is present in an amount independent of any other promoter material.

In a further aspect, a disclosed catalyst composition can be a mixture of: (a) a first catalyst composition comprising ruthenium in an amount from about 1 wt % to about 5 wt % based on the total weight of the heterogeneous catalyst; a promoter material comprising $K_2O$, and wherein the promoter material is present in an amount of about 0.1 wt % to about 5 wt % based on the total weight of the heterogeneous catalyst; and a metal oxide support comprising $Al_2O_3$; and (b) a second catalyst composition comprising ruthenium in an amount from about 1 wt % to about 5 wt % based on the total weight of the heterogeneous catalyst; a promoter material comprising $K_2O$, and wherein the promoter material is present in an amount of about 0.1 wt % to about 5 wt % based on the total weight of the heterogeneous catalyst; and a metal oxide support comprising $Al_2O_3$.

In a further aspect, a disclosed catalyst composition can be a mixture of: (a) a first catalyst composition comprising ruthenium in an amount from about 1 wt % to about 5 wt % based on the total weight of the heterogeneous catalyst; a promoter material comprising $K_2O$, and wherein the promoter material is present in an amount of about 0.1 wt % to about 5 wt % based on the total weight of the heterogeneous catalyst; and a metal oxide support comprising $Al_2O_3$; and (b) a second catalyst composition comprising ruthenium in an amount from about 1 wt % to about 5 wt % based on the total weight of the heterogeneous catalyst; and a metal oxide support comprising $Al_2O_3$.

Further aspects of the disclosed heterogeneous catalysts are provided in the "Claims" section herein below.

C. Processes for Preparing the Catalyst Compositions

In accordance with the purpose of the disclosure, as embodied and broadly described herein, another aspect of the present disclosure relates to processes for making the disclosed catalyst compositions. In an aspect the process comprises preparing a mixture of cobalt salt and the metal oxide. In another aspect, the process comprises preparing a mixture of ruthenium salt and the metal oxide. In still another aspect, the process comprises preparing a mixture of cobalt and ruthenium salts and the metal oxide. In a further aspect, the process comprises preparing a mixture of two catalyst compositions.

In various aspects, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.1 wt % to about 20 wt % based on the total weight of the metal oxide support and the metal compound; wherein the metal compound is an organometallic compound or a metal salt comprising a metal selected from Group 7, Group 8, Group 9, Group 10, Group 11, or combinations thereof; wherein the metal oxide support is present in an amount of about 60 wt % to about 99 wt % based on the total weight of the metal oxide support and the metal compound; and, reacting the mixture at a temperature of about 5° C. to about 95° C. for a period of time from about 1 minute to about 72 hours; thereby forming the heterogeneous catalyst.

In a further aspect, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 20 wt % based on the total weight of the metal oxide support and the metal compound; wherein the metal compound is an organometallic compound or a metal salt comprising a metal selected from Group 7, Group 8, Group 9, Group 10, Group 11, or combinations thereof; wherein the metal oxide support is present in an amount of about 60 wt % to about 99 wt % based on the total weight of the metal oxide support and the metal compound; and, reacting the mixture at a temperature of about 5° C. to about 95° C. for a period of time from about 1 minute to about 72 hours; thereby forming the heterogeneous catalyst. In a further aspect, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 10 wt % based on the total weight of the metal oxide support and the metal compound; wherein the metal compound is an organometallic compound or a metal salt comprising a metal selected from Group 7, Group 8, Group 9, Group 10, Group 11, or combinations thereof; wherein the metal oxide support is present in an amount of about 60 wt % to about 99 wt % based on the total weight of the metal oxide support and the metal compound; and, reacting the mixture at a temperature of about 5° C. to about 95° C. for a period of time from about 1 minute to about 72 hours; thereby forming the heterogeneous catalyst.

In various aspects, disclosed are processes for synthesizing a disclosed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 50 wt % based on the total weight of the metal oxide support and the ruthenium; wherein the ruthenium compound is an organometallic compound or a metal cation derived from a metal salt; wherein the metal oxide support is present in an amount of about 60 wt % to about 99 wt % based on the total weight of the metal oxide support and the cobalt compound; and, reacting the mixture at a temperature of about 5° C. to about 95° C. for a period of time from about 1 minute to about 72 hours; thereby forming the heterogeneous catalyst.

In various aspects, disclosed are processes for synthesizing a disclosed mixed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 50 wt % based on the total weight of the metal oxide support and the ruthenium; wherein the ruthenium compound is an organometallic compound or a metal cation derived from a metal salt; wherein the metal oxide support is present in an amount of about 60 wt % to about 99 wt % based on the total weight of the metal oxide support and the ruthenium compound; and, reacting the mixture at a temperature of about 5° C. to about 95° C. for a period of time from about 1 minute to about 72 hours; thereby forming a first heterogeneous catalyst. In another aspect, the process further comprises: forming a cobalt compound solution comprising a cobalt compound and a solvent; wherein the cobalt compound is present in amount corresponding to about 0.05 wt % to about 50 wt % based on the total weight of the metal oxide support and the cobalt; wherein the cobalt compound is an organometallic compound or a metal cation derived from a metal salt; wherein the metal oxide support is present in an amount of about 60 wt % to about 99 wt % based on the total weight of the metal oxide support and the cobalt compound; and, reacting the mixture at a temperature of about 5° C. to about 95° C. for a period of time from about 1 minute to about 72 hours; thereby forming a second heterogeneous catalyst. Following formation of the first and second heterogeneous catalysts, the first (i.e., ruthenium-containing) catalyst and the second (i.e., cobalt-containing) catalyst are physically mixed in a ratio of from about 2:1 to about 1:2, first catalyst:second catalyst.

In various aspects, disclosed are processes for synthesizing a disclosed heterogeneous catalyst, the process comprising: forming a cobalt compound solution comprising a cobalt compound and a solvent; forming a mixture of the cobalt compound solution and a metal oxide; wherein the cobalt compound is present in amount corresponding to about 0.05 wt % to about 50 wt % based on the total weight of the metal oxide support and the cobalt; wherein the cobalt compound is an organometallic compound or a metal cation derived from a metal salt; wherein the metal oxide support is present in an amount of about 60 wt % to about 99 wt % based on the total weight of the metal oxide support and the cobalt compound; and, reacting the mixture at a temperature of about 5° C. to about 95° C. for a period of time from about 1 minute to about 72 hours; thereby forming the heterogeneous catalyst.

In various aspects, disclosed are processes for synthesizing a disclosed heterogeneous catalyst, the process comprising: forming a cobalt compound solution comprising a cobalt compound and a solvent; forming a mixture of the cobalt compound solution and a metal oxide; wherein the cobalt compound is present in amount corresponding to about 0.05 wt % to about 20 wt % based on the total weight of the metal oxide support and the cobalt; wherein the cobalt compound is an organometallic compound or a metal cation derived from a metal salt; wherein the metal oxide support is present in an amount of about 60 wt % to about 99 wt % based on the total weight of the metal oxide support and the cobalt compound; and, reacting the mixture at a temperature of about 5° C. to about 95° C. for a period of time from about 1 minute to about 72 hours; thereby forming the heterogeneous catalyst.

In various aspects, disclosed are processes for synthesizing a disclosed heterogeneous catalyst, the process comprising: forming a cobalt compound solution comprising a cobalt compound and a solvent; forming a mixture of the cobalt compound solution and a metal oxide; wherein the cobalt compound is present in amount corresponding to about 0.05 wt % to about 10 wt % based on the total weight of the metal oxide support and the cobalt; wherein the cobalt compound is an organometallic compound or a metal cation derived from a metal salt; wherein the metal oxide support is present in an amount of about 60 wt % to about 99 wt % based on the total weight of the metal oxide support and the cobalt compound; and, reacting the mixture at a temperature of about 5° C. to about 95° C. for a period of time from about 1 minute to about 72 hours; thereby forming the heterogeneous catalyst.

In various aspects, the disclosed catalysts can be prepared by an incipient wetness impregnation method.

In various aspects, the disclosed catalysts can be prepared by using spray application methods comprising spraying a solution of the cobalt salt and/or ruthenium salt onto a metal oxide support.

In various aspects, the disclosed catalysts can be prepared using chemical vapor deposition methods.

In various aspects, the disclosed catalysts can be prepared using digital printing (i.e., 3D printing) methods.

In various aspects, the disclosed catalysts can be prepared using a metal nano particle material, wherein a cobalt metal nanoparticle material and/or a ruthenium metal nanoparticle material is prepared using sol-gel techniques, followed by adhering the cobalt metal containing sol-gel onto the metal oxide support, then calcining the material to fix the cobalt metal and/or the ruthenium metal onto the metal oxide support.

In various aspects, drying is understood to include a state wherein the catalyst is essentially dry, but nevertheless comprises some amount of solvent, such as water. That is the material can be dry, but have solvent molecules present in the pore structure of the catalyst such that there are hydroxyl (OH) groups and protons present on a surface of the catalyst.

In various aspects, the catalyst can be used in the disclosed methods for conversion of nitrogen and hydrogen into ammonia after the calcining step of the disclosed methods for the preparation of the catalyst. Optionally, after the calcining step, the catalyst can be further processed by a pre-reduction step wherein the catalyst is exposed to a flow of gas comprising hydrogen. The pre-reduction step can further comprise heating the catalyst in the presence of the gas flow. In one aspect, the pre-reduction step can be thermal-only. Further in this aspect, the pre-reduction step can occur at one temperature or at a series of temperatures. In another aspect, the pre-reduction step can occur in a microwave. In one aspect, pre-reduction occurs at from 150° C. to 350° C., or from 180° C. to 280° C., or at about 180, 190, 200, 210, 220, 230, 240, 250, 260, 270, or about 280° C., or a combination of any of the foregoing values, or a range encompassing any of the foregoing values. In one aspect, pre-reduction is thermal only and occurs at 280° C., followed by a second step at 180° C. In another aspect, pre-reduction is thermal and occurs at only either 180° C. or at 280° C. In yet another aspect, pre-reduction is conducted in a microwave at 280° C.

Further aspects of the disclosed processes for preparing the heterogeneous catalysts are provided in the "Aspects" section herein below.

D. Processes for Synthesis of Ammonia and C2-C4 Hydrocarbons from Nitrogen and C1-C4 Hydrocarbons In various aspects, the present disclosure pertains to processes for the synthesis of ammonia, ethane, ethylene, and/or acetylene, comprising: providing a reaction chamber with a heterogeneous catalyst; wherein the heterogeneous catalyst comprises one or more metals selected from Group 7, Group 8, Group 9, Group 10, Group 11, and combinations thereof; wherein the metal is present in an amount from about 0.1 wt % to about 20 wt % based on the total weight of the heterogeneous catalyst; and a metal oxide support; wherein the reaction chamber has a reaction pressure of about 2 torr to about 20 atm; conveying a flow of a reactant gas mixture into the reaction chamber via an entry port; wherein the reactant gas mixture comprises nitrogen and at least one C1-C4 hydrocarbon; contacting the reactant gas mixture and the heterogeneous catalyst; heating the heterogeneous catalyst using microwave energy, thereby providing a product gas mixture; and wherein the product gas mixture comprises ammonia, hydrogen, ethane, ethylene, and/or acetylene; conveying the product gas mixture from the reaction chamber via an exit port.

In various aspects, a disclosed process for ammonia synthesis comprises: providing a reaction chamber with a disclosed heterogeneous catalyst, or a heterogeneous catalyst made by a disclosed process; conveying a flow of a reactant gas mixture into the reaction chamber via an entry port; contacting the reactant gas mixture and the heterogeneous catalyst; heating the heterogeneous catalyst using microwave energy, thereby providing a product gas mixture; and conveying the product gas mixture from the reaction chamber via an exit port; wherein the reaction chamber has a pressure of about 2 torr to about 20 atm; wherein the reactant gas mixture comprises nitrogen and at least one C1-C4 hydrocarbon; and wherein the product gas mixture comprises ammonia and C2-C4 hydrocarbons.

In various aspects, the present disclosure pertains to processes for the synthesis of ammonia, ethane, ethylene, and/or acetylene, comprising: providing a reaction chamber with a heterogeneous catalyst; wherein the heterogeneous catalyst comprises one or more metals selected from Group 7, Group 8, Group 9, Group 10, Group 11, and combinations thereof; wherein the metal is present in an amount from about 0.1 wt % to about 20 wt % based on the total weight of the heterogeneous catalyst; and a metal oxide support; wherein the reaction chamber has a reaction pressure of about 2 torr to about 20 atm; conveying a flow of a reactant gas mixture into the reaction chamber via an entry port; wherein the reactant gas mixture comprises nitrogen and at least one C1-C4 hydrocarbon; contacting the reactant gas mixture and the heterogeneous catalyst; heating the heterogeneous catalyst using microwave energy, thereby providing a product gas mixture; and wherein the product gas mixture comprises ammonia, hydrogen, and C2-C4 hydrocarbons; conveying the product gas mixture from the reaction chamber via an exit port. In a further aspect, the C2-C4 hydrocarbons present in the product gas mixture can comprise one or more alkane, alkene, and/or alkyne, including, but not limited to, ethane, ethylene, and acetylene.

In various aspects, a disclosed process for ammonia synthesis comprises: providing a reaction chamber with a disclosed heterogeneous catalyst, or a heterogeneous catalyst made by a disclosed process; conveying a flow of a reactant gas mixture into the reaction chamber via an entry port; contacting the reactant gas mixture and the heterogeneous catalyst; heating the heterogeneous catalyst using microwave energy, thereby providing a product gas mixture; and conveying the product gas mixture from the reaction chamber via an exit port; wherein the reaction chamber has a pressure of about 2 torr to about 20 atm; wherein the reactant gas mixture comprises nitrogen and at least one C1-C4 hydrocarbon; and wherein the product gas mixture comprises ammonia, hydrogen, and C2-C4 hydrocarbons. In a further aspect, the C2-C4 hydrocarbons present in the product gas mixture can comprise one or more alkane, alkene, and/or alkyne, including, but not limited to, ethane, ethylene, and acetylene.

Referring now to FIG. 1, a disclosed fixed bed reaction chamber is showing in a cross-sectional view. Briefly, the fixed bed reaction chamber comprises: a catalyst 300 in a fixed bed within a quartz tube 10; a reactant gas mixture feed 100 conveyed through an entry port 50; a spark generator 30; a microwave input 21 and a sliding short circuit (or alternatively referred to herein as a "sliding short") 20, wherein the sliding short circuit can be used to adjust the location of the electric field maximum in the reaction chamber; an exit port 60 through which is conveyed a product gas mixture 200; into a directing chamber which can be configured to direct streams of the product gas mixture to various optional destinations, e.g., a moisture removal apparatus 70 to collect product gas with water removed; analytical instrumentation, e.g., GC chromatography, 71 or mass spectrometry 72.

Further aspects of the disclosed processes for synthesis of ammonia and C2+ hydrocarbons using microwave energy and the disclosed heterogeneous catalysts are provided in the "Claims" section herein below. In one aspect, the disclosed process can be represented by the following reaction scheme:

In various aspects, the disclosed process utilizes variable microwave energy and a catalyst to efficiently synthesize ammonia from a reactant gas mixture comprising methane and nitrogen.

In a conventional Haber-Bosch (H-B) process, the synthesis of ammonia can be represented as follows:

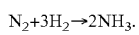

The reaction is exothermic, and the equilibrium lies to the right at low temperature. However, the rate of ammonia generation is slow. Catalysts can be used to speed up the rate of reaction. However, high temperatures are required for a catalyst to work, and due to the negative entropy of the reaction, the higher temperatures result in a shift of the product back to the reactants. Pressure is commonly increased to drive equilibrium to the right. The resulting process is commonly carried out at temperatures ranging from 380 to 570° C. and pressures ranging from 150 to 250 atmospheres.

In a conventional H-B process, the rate determining step is primarily the dissociation of the $N_2$ on the catalyst surface:

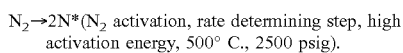

In comparison, in various aspects of the present disclosure, microwave irradiation is employed to activate reactant molecules and "active sites" on the catalyst to form intermediates that undergo reaction pathways of lower activation energy. Therefore, the energy intensive high-pressure reaction/high temperature required for conventional H-B process can be avoided.

In various aspects, under low temperature and ambient pressure, the disclosed processes synergistically integrate microwave (including microwave induced plasma) reaction chemistry with heterogeneous catalysts that selectively activate nitrogen gas and at least one C1-C4 hydrocarbon through microwave irradiation. Without being bound by any particular theory, one of the possible mechanisms by which the catalyst and reacting species can interact with the microwave field and provide energy to the reaction is by relaxation processes, such as dipolar or Debye processes, which involve the coupling of the radiation with dipoles in the solid catalyst. The dipoles can be defect sites (i.e. atomic vacancies) in the catalysts or dangling bonds on the surface of catalysts. From the standpoint of catalysis, dipoles on the surface can be reactant or products that would be susceptible to selective bond activation effects, which in turn can affect reaction rates.

In various aspects, the disclosed process can utilize variable frequency microwave energy to activate reactant and active sites on the surface of catalyst. According to the various aspects, by using microwave catalytic technology, it is believed that the disclosed process for catalytic ammonia synthesis undergoes a new reaction pathway where the barrier for the initial dissociation of the dinitrogen is decoupled from the bonding energy of the intermediates.

Microwave catalytic process include a specific scenario where microwave can induce plasma. This specific scenario is relevant to microwave-assisted plasma reaction chemistry. In some instances, a microwave plasma can be formed, plasma-activated nitrogen will generate nitrogen ions $N_2+^*$ and free radicals such as $NH_x^*$, $N^*$, $H^*$ which react over the catalyst surface to with hydrogen formed from the at least one C1-C4 hydrocarbon to form ammonia under low reaction severity. The disclosed processes synergistically integrate microwave plasma reaction chemistry with novel heterogeneous catalysis to decouple dinitrogen molecular activation from catalytic surface reaction, shifting the rate-determining step from dinitrogen dissociation to hydrogenation of $N_2^*$. Similarly, the disclosed processes synergistically integrate microwave plasma reaction chemistry with novel heterogeneous catalysis to decouple C1-C4 hydrocarbon activation from catalytic surface reaction.

The disclosed process is currently estimated to provide about a 50% reduction in capital expenses. Moreover, due to the elimination of the requirement for hydrogen production from steam reforming of natural gas, it can be calculated that the disclosed processes provide a significant improvement in energy efficiency (>60%). In addition, the overall product distribution can be tuned based on choice of catalyst and microwave irradiation parameters (e.g., power output and frequency). In contrast to conventional natural conversion methods, the disclosed processes offer an approach without concomitant carbon dioxide emissions. Other benefits of the disclosed processes can include distributed scale application; employment of the processes where electricity is inexpensive (and available); and improved ease of operation relative to high pressure H-B processes (e.g., quick start-up/shutdown, system upsets).

With respect to the latter benefit, with conventional H-B processes the high pressure and temperature requirements necessitate steady state operation. However, in the paradigm of renewable energy conversion, utilizing intermittent excess energy, steady state operation would be challenging. Thus, on-demand ammonia synthesis enabled by a low pressure and temperature catalyzed microwave catalytic process would provide tremendous advantage E. Aspects The following listing of exemplary aspects supports and is supported by the disclosure provided herein.

Aspect 1. A process for synthesizing ammonia, comprising: (a.) providing a reaction chamber with a heterogeneous catalyst; wherein the heterogeneous catalyst comprises a metal selected from the group consisting of Group 7, Group 8, Group 9, Group 10, Group 11, and combinations thereof; wherein the metal is present in an amount from about 0.1 wt % to about 20 wt % based on the total weight of the heterogeneous catalyst; and a metal oxide support; wherein the reaction chamber has a reaction pressure of about 2 torr to about 20 atm; (b.) conveying a flow of a reactant gas mixture into the reaction chamber via an entry port; wherein the reactant gas mixture comprises nitrogen and at least one C1-C4 hydrocarbon; (c.) contacting the reactant gas mixture and the heterogeneous catalyst; (d.) heating the heterogeneous catalyst using microwave energy, thereby providing a product gas mixture; wherein the product gas mixture comprises ammonia and hydrogen; and (e.) conveying the product gas mixture from the reaction chamber via an exit port.

Aspect 2. The process of Aspect 1, wherein the metal is selected from the group consisting of ruthenium, cobalt, rhodium, palladium, osmium, iridium, platinum, cobalt, manganese, and combinations thereof.

Aspect 3. The process of Aspect 2, wherein the metal is cobalt; and wherein the cobalt is present as cobalt (0), cobalt (II), cobalt (III), cobalt (IV), or combinations thereof.

Aspect 4. The process of Aspect 2, wherein the metal is ruthenium; and wherein the ruthenium is present as ruthenium(0), ruthenium (II), ruthenium(III), ruthenium(IV), or combinations thereof.

Aspect 5. The process of any one of Aspects 1-3, wherein the metal is present in an amount from about 0.5 wt % to about 10 wt %.

Aspect 6. The process of Aspect 5, wherein the metal is present in an amount from about 1 wt % to about 7 wt %.

Aspect 7. The process of Aspect 2, wherein the metal is ruthenium and cobalt.

Aspect 8. The process of Aspect 7, wherein the cobalt is present in an amount of from about 0.5 wt % to about 9.5 wt % and the ruthenium is present in an amount of from about 0.5 wt % to about 9.5 wt %.

Aspect 9. The process of Aspect 8, wherein the cobalt is present in an amount of about 5 wt % and the ruthenium is present in an amount of about 4 wt %.

Aspect 10. The process of Aspect 1, further comprising providing the reaction chamber with a second heterogeneous catalyst; wherein the second heterogeneous catalyst comprises a second metal selected from the group consisting of Group 7, Group 8, Group 9, Group 10, Group 11, and combinations thereof; wherein the second metal is present in an amount of from about 0.1 wt % to about 20 wt % based on the total weight of the second heterogeneous catalyst; and a metal oxide support; and wherein the heterogeneous catalyst and the second heterogeneous catalyst are physically mixed together prior to beginning the process.

Aspect 11. The process of Aspect 10, wherein the heterogeneous catalyst and the second heterogeneous catalyst are present in a weight ratio of from about 2:1 to about 1:2.

Aspect 12. The process of Aspect 11, wherein the heterogeneous catalyst and the second heterogeneous catalyst are present in a weight ratio of about 1:1.

Aspect 13. The process of any of Aspects 10-12, wherein the metal is ruthenium and the second metal is cobalt.

Aspect 14. The process of any one of Aspects 1-6, wherein the metal oxide support comprises MgO, $Al_2O_3$, $SiO_2$, $TiO_2$, $ZrO_2$, $HfO_2$, zeolite, or combinations thereof.

Aspect 15. The process of Aspect 11, wherein the metal oxide support comprises $Al_2O_3$, $SiO_2$, a zeolite, or combinations thereof.

Aspect 16. The process of Aspect 11 or Aspect 15, wherein the $Al_2O_3$ comprises a fumed alumina, $\alpha$-$Al_2O_3$, $\delta$-$Al_2O_3$, $\gamma$-$Al_2O_3$, or combinations thereof.

Aspect 17. The process of Aspect 11 or Aspect 15, wherein the $Al_2O_3$ consists substantially of $\gamma$-$Al_2O_3$.

Aspect 18. The process of any one of Aspects 11-17, wherein surface area of the alumina is from about 50 $m^2/g$ to about 500 $m^2/g$.

Aspect 19. The process of any one of Aspects 11-17, wherein surface area of the alumina is from about 75 $m^2/g$ to about 250 $m^2/g$.

Aspect 20. The process of any one of Aspects 11-17, wherein surface area of the alumina is from about 100 $m^2/g$ to about 200 $m^2/g$.

Aspect 21. The process of Aspect 11 or Aspect 15, wherein the zeolite comprises one or more zeolite materials.

Aspect 22. The process of Aspect 21, wherein the zeolite material is selected from a ZSM-5, Zeolite 6, Zeolite X, and USY zeolite.

Aspect 23. The process of any one of Aspects 11, 15, or 21-22, wherein the zeolite has a $SiO_2/Al_2O_3$ mole ratio from about 5 to about 50.

Aspect 24. The process of any one of Aspects 11, 15, or 21-22, wherein the zeolite has a $SiO_2/Al_2O_3$ mole ratio from about 7.5 to about 25.

Aspect 25. The process of any one of Aspects 11, 15, or 21-22, wherein the zeolite has a $SiO_2/Al_2O_3$ mole ratio from about 7.5 to about 15.

Aspect 26. The process of any one of Aspects 11, 15, or 21-22, wherein the zeolite has a $SiO_2/Al_2O_3$ mole ratio from about 10 to about 20.

Aspect 27. The process of any one of Aspects 11, 15, or 21-22, wherein the zeolite has a $SiO_2/Al_2O_3$ mole ratio from about 10 to about 15.

Aspect 28. The process of any one of Aspects 11, 15, or 21-22, wherein the zeolite has a $SiO_2/Al_2O_3$ mole ratio of about 11.5.

Aspect 29. The process of any one of Aspects 11, 15, or 21-28, wherein the zeolite has a surface area from about 200 $m^2/g$ to about 600 $m^2/g$.

Aspect 30. The process of any one of Aspects 11, 15, or 21-28, wherein the zeolite has a surface area from about 300 $m^2/g$ to about 500 $m^2/g$.

Aspect 31. The process of any one of Aspects 11, 15, or 21-28, wherein the zeolite has a surface area of about 350 $m^2/g$ to about 450 $m^2/g$.

Aspect 32. The process of any one of Aspects 11, 15, or 21-28, wherein the zeolite has a surface area of about 425 $m^2/g$.

Aspect 33. The process of any one of Aspects 1-32, the heterogeneous catalyst further comprises a promoter metal present in an amount of about 0.1 wt % to about 5 wt % based on the total weight of the heterogeneous catalyst; wherein the promoter metal is selected from the group consisting of Group 1, Group 2, Group 7, Group 8, Group 9, Group 10, Group 11, and combinations thereof; and wherein the promoter metal is not the same as the metal of the heterogeneous catalyst.

Aspect 34. The process of Aspect 33, wherein the promoter metal is present in an amount of about 0.1 wt % to about 5 wt %.

Aspect 35. The process of Aspect 34, wherein the promoter metal is present in an amount of about 0.1 wt % to about 2.5 wt %.

Aspect 36. The process of Aspect 34, wherein the promoter metal is present in an amount of about 0.1 wt % to about 1 wt %.

Aspect 37. The process of any one of Aspects 33-36, wherein the promoter metal is iron.

Aspect 38. The process of Aspect 37, wherein the iron is present as iron (0), iron (II), iron (Ill), or combinations thereof.

Aspect 39. The process of Aspect 33, wherein the promoter metal is selected from the group consisting of Group 1, Group 2, and combinations thereof.

Aspect 40. The process of Aspect 39, wherein the promoter metal comprises an oxide of Na, K, Cs, Mg, Ba, Ca, or combinations thereof.

Aspect 41. The process of Aspect 40, wherein the promoter metal comprises $K_2O$.

Aspect 42. The process of any one of Aspects 1-41, wherein the reactant gas mixture comprises about 1 vol % to about 90 vol % of nitrogen; and about 1 vol % to about 90 vol % of the at least one C1-C4 hydrocarbon; provided that the total vol % of all gases in the reactant gas mixture is equal to about 100 vol %.

Aspect 43. The process of Aspect 42, wherein the reactant gas mixture comprises about 50 vol % to about 90 vol % of nitrogen; and about 10 vol % to about 50 vol % of the at least one C1-C4 hydrocarbon.

Aspect 44. The process of Aspect 42, wherein the reactant gas mixture comprises about 65 vol % to about 75 vol % of nitrogen; and about 25 vol % to about 35 vol % of the at least one C1-C4 hydrocarbon.

Aspect 45. The process of any one of Aspects 1-44, wherein the heating the reaction chamber is using microwave energy having at a frequency of about 300 MHz to about 100 GHz.

Aspect 46. The process of Aspect 45, wherein the heating the reaction chamber is using microwave energy having at a frequency of about 0.9 GHz to about 100 GHz.

Aspect 47. The process of any one of Aspects 1-46, wherein the heating the heterogeneous catalyst using microwave energy heats the heterogeneous catalyst to a heterogeneous catalyst temperature of from about 50° C. to about 1000° C.

Aspect 48. The process of Aspect 47, wherein the heterogeneous catalyst temperature is from about 50° C. to about 500° C.

Aspect 49. The process of Aspect 47, wherein the heterogeneous catalyst temperature is from about 50° C. to about 250° C.

Aspect 50. The process of Aspect 47, wherein the heterogeneous catalyst temperature is from about 100° C. to about 500° C.

Aspect 51. The process of Aspect 47, wherein the heterogeneous catalyst temperature is from about 100° C. to about 250° C.

Aspect 52. The process of any one of Aspects 1-51, wherein the C1-C4 hydrocarbon is methane, ethane, propane, or combinations thereof.

Aspect 53. The process of Aspect 52, wherein the C1-C4 hydrocarbon consists substantially of methane.

Aspect 54. The process of Aspect 52, wherein the C1-C4 hydrocarbon consists substantially of ethane.

Aspect 55. The process of Aspect 52, wherein the C1-C4 hydrocarbon consists substantially of propane.

Aspect 56. The process of Aspect 52, wherein the C1-C4 hydrocarbon consists substantially of a mixture of methane and ethane.

Aspect 57. The process of any one of Aspects 1-56, wherein the heating the reaction chamber using microwave energy induces plasma formation.

Aspect 58. The process of Aspect 17, wherein the reactant gas mixture further comprises an igniter gas.

Aspect 59. The process of Aspect 58, wherein the igniter gas is argon.

Aspect 60. The process of any one of Aspects 52-59, wherein plasma formation induces ionization of nitrogen, the at least one C1-C4 hydrocarbon, or both.

Aspect 61. The process of any one of Aspects 1-46, wherein the process yields ammonia at about 0.05 $\mu mol_{NH3}$/($g_{catalyst}$·hour) to about 0.1 $mol_{NH3}$/($g_{catalyst}$·hour).

Aspect 62. The process of Aspect 61, wherein the process yields ammonia at about 0.1 $\mu mol_{NH3}$ ($g_{catalyst}$·hour) to about 0.05 $mol_{NH3}$/($g_{catalyst}$·hour).

Aspect 63. The process of any one of Aspects 1-46, wherein the process yields hydrogen at about 1 $\mu mol_{H2}$ ($g_{catalyst}$·hour) to about 0.1 $mol_{H2}$/($g_{catalyst}$·hour).

Aspect 64. The process of Aspect 62, wherein the process yields hydrogen at about 10 $\mu mol_{H2}$/($g_{catalyst}$·hour) to about 0.05 $mol_{H2}$/($g_{catalyst}$·hour).

Aspect 65. The process of any one of Aspects 1-46, wherein the process yields acetylene at from about 0.01% to about 1% of the product gas mixture.

Aspect 66. The process of Aspect 65, wherein the process yields acetylene at from about 0.01% to about 0.05% of the product gas mixture.

Aspect 67. The process of any one of Aspects 1-46, wherein the process yields ethylene at from about 0.01% to about 1% of the product gas mixture.

Aspect 68. The process of Aspect 67, wherein the process yields ethylene at from about 0.01% to about 0.4% of the product gas mixture.

Aspect 69. The process of any one of Aspects 1-46, wherein the process yields ethane at from about 0.01% to about 0.5% of the product gas mixture.

Aspect 70. The process of Aspect 69, wherein the process yields ethane at from about 0.02% to about 0.2% of the product gas mixture.

Aspect 71. The process of any one of Aspects 1-64, wherein the product gas mixture further comprises at least one higher hydrocarbon.

Aspect 72. The process of Aspect 71, wherein the at least one higher hydrocarbon comprises ethane, ethylene, acetylene, or combinations thereof.

Aspect 73. The process of Aspect 71, wherein the at least one higher hydrocarbon comprises aromatic hydrocarbons comprising a mixture of olefins, benzene, toluene, xylene, or C9 or greater aromatic compounds.

Aspect 74. The process of any one of Aspects 1-73, further comprising at least solid carbon material.

Aspect 75. The process of Aspect 74, wherein the solid carbon material forms in contact with the heterogeneous catalyst.

Aspect 76. The process of Aspect 74 or Aspect 75, wherein the solid carbon material comprises carbon nanotubes, carbon fibers, graphene, or mixtures thereof.

Aspect 77. The process of Aspect 76, wherein the carbon nanotubes comprise tip growth carbon nanotubes, base growth carbon nanotubes, or mixtures thereof.

Aspect 78. The process of any of Aspect 76 or Aspect 77, further comprising purifying the carbon nanotubes from the heterogeneous catalyst.

Aspect 79. The process of any one of Aspects 1-78, wherein the process has a single pass methane conversion efficiency of about 5 vol % to about 100 vol %.

Aspect 80. The process of Aspect 79, wherein the process has a methane conversion efficiency of about 30 vol % to about 100 vol %.

Aspect 81. The process of Aspect 79, wherein the process has a methane conversion efficiency of about 40 vol % to about 100 vol %.

Aspect 82. The process of Aspect 79, wherein the process has a methane conversion efficiency of about 50 vol % to about 100 vol %.

Aspect 83. The process of Aspect 79, wherein the process has a methane conversion efficiency of about 60 vol % to about 100 vol %.

Aspect 84. The process of Aspect 79, wherein the process has a methane conversion efficiency of about 70 vol % to about 100 vol %.

Aspect 85. The process of Aspect 79, wherein the process has a methane conversion efficiency of about 80 vol % to about 100 vol %.

Aspect 86. The process of Aspect 79, wherein the process has a methane conversion efficiency of about 90 vol % to about 100 vol %.

Aspect 87. The process of any one of Aspects 1-86, further comprising reducing the heterogeneous catalyst prior to providing the reaction chamber with the heterogeneous catalyst.

Aspect 88. The process of Aspect 88, wherein the reducing the heterogeneous catalyst comprises conveying a flow of a first reducing gas comprising $H_2$ such that the first reducing gas comprising H2 contacts the heterogeneous catalyst; and heating the heterogeneous catalyst at a first catalyst reducing temperature from about 100° C. to about 1,000° C.

Aspect 89. The process of Aspect 88, wherein the reducing is carried out for a first catalyst reducing period of time; and wherein the first catalyst reducing period of time is sufficient to reduce at least 50 wt % of the metal to metal (0).

Aspect 90. The process of Aspect 88, wherein the reducing is carried out for a first catalyst reducing period of time; and wherein the first catalyst reducing period of time is sufficient to reduce at least 60 wt % of the metal to metal (0).

Aspect 91. The process of Aspect 88, wherein the reducing is carried out for a first catalyst reducing period of time; and wherein the first catalyst reducing period of time is sufficient to reduce at least 70 wt % of the metal to metal (0).

Aspect 92. The process of Aspect 88, wherein the reducing is carried out for a first catalyst reducing period of time; and wherein the first catalyst reducing period of time is sufficient to reduce at least 80 wt % of the metal to metal (0).

Aspect 93. The process of Aspect 8879, wherein the first catalyst reducing temperature is from about 350° C. to about 800° C.

Aspect 94. The process of Aspect 88, wherein the first catalyst reducing temperature is about 280° C.

Aspect 95. The process of Aspect 88, wherein the first catalyst reducing temperature is about 180° C.

Aspect 96. The process of Aspect 88, further comprising heating the heterogeneous catalyst at a second catalyst reducing temperature of from about 100° C. to about 1,0000° C.

Aspect 97. The process of Aspect 96, wherein the second catalyst reducing temperature is about 180° C.

Aspect 98. The process of Aspect 96, wherein the first catalyst reducing temperature is about 280° C. and the second catalyst reducing temperature is about 180° C.

Aspect 99. The process of Aspect 79, wherein the first catalyst reducing period of time is from about 1 min to about 12 hours.

Aspect 100. The process of any one of Aspects 1-99, further comprising reducing the heterogeneous catalyst in the reaction chamber prior to conveying the flow of the reactant gas mixture into the reaction chamber.

Aspect 101. The process of Aspect 100, wherein the reducing the heterogeneous catalyst comprises conveying a flow of a second reducing gas comprising $H_2$ such that the second reducing gas comprising H2 contacts the heterogeneous catalyst; and heating the heterogeneous catalyst using microwave energy at a second catalyst reducing temperature from about 100° C. to about 1,000° C.

Aspect 102. The process of Aspect 101, wherein the reducing is carried out for a second catalyst reducing period of time; and wherein the second catalyst reducing period of time is sufficient to reduce at least 50 wt % of the metal to metal (0).

Aspect 103. The process of Aspect 101, wherein the reducing is carried out for a second catalyst reducing period of time; and wherein the second catalyst reducing period of time is sufficient to reduce at least 60 wt % of the metal to metal (0).

Aspect 104. The process of Aspect 101, wherein the reducing is carried out for a second catalyst reducing period of time; and wherein the second catalyst reducing period of time is sufficient to reduce at least 70 wt % of the metal to metal (0).

Aspect 105. The process of Aspect 101, wherein the reducing is carried out for a second catalyst reducing period of time; and wherein the second catalyst reducing period of time is sufficient to reduce at least 80 wt % of the metal to metal (0).

Aspect 106. The process of any one of Aspects 1-105, further comprising pre-heating the reactant gas mixture to a reactant gas mixture pre-heat temperature prior to conveying the flow of a reactant gas mixture into the reaction chamber via an entry port; and wherein the reactant gas mixture pre-heat temperature is from about 20° C. to about 1000° C.

Aspect 107. The process of Aspect 106, wherein the reactant gas mixture pre-heat temperature is from about 50° C. to about 600° C.

Aspect 108. The process of any one of Aspects 1-107, wherein the reaction pressure is from about 2 torr to about 10 atm.

Aspect 109. The process of Aspect 108, wherein the reaction pressure is from about 1 atm to about 5 atm.

Aspect 110. The process of Aspect 108, wherein the reaction pressure is from about 1 atm to about 2.5 atm.

Aspect 111. The process of Aspect 108 wherein the reaction pressure is from about 0.7 atm to about 1.5 atm.

Aspect 112. The process of Aspect 108, wherein the reaction pressure is about the same as ambient pressure.

Aspect 113. The process of any one of Aspects 1-112, wherein the process is carried out in a continuous flow mode.

Aspect 114. The process of Aspect 113, wherein process is carried out at a Gas Hourly Space Velocity (GHSV) of about 500 $h^{-1}$ to about 50,000 $h^{-1}$.

Aspect 115. The process of Aspect 113, wherein process is carried out at a Gas Hourly Space Velocity (GHSV) of about 1,000 $h^{-1}$ to about 20,000 $h^{-1}$.

Aspect 116. The process of Aspect 113, wherein process is carried out at a Gas Hourly Space Velocity (GHSV) of about 1,000 $h^{-1}$ to about 10,000 $h^{-1}$.

Aspect 117. The process of any one of Aspects 1-117, wherein the process is carried out in a batch processing mode.

Aspect 118. The process of Aspect 117, wherein the process is carried out with a residence time of the reactant gas mixture in the reaction chamber of from about 0.1 minute to about 3 hours.

Aspect 119. The process of Aspect 117, wherein the process is carried out with a residence time of the reactant gas mixture in the reaction chamber of from about 10 minutes to about 2 hours.

Aspect 120. The process of Aspect 117, wherein the process is carried out with a residence time of the reactant gas mixture in the reaction chamber of from about 30 minutes to about 1.5 hours.

Aspect 121. The process of any one of Aspects 1-120, further comprising a regeneration cycle comprising terminating the flow of reactant gas and providing a regeneration gas to the catalyst bed; wherein the regeneration gas is in contact with the catalyst bed for a regeneration time period at regeneration temperature and a regeneration pressure; wherein the regeneration time period is from about 15 minutes to about 20 hours; wherein the regeneration temperature is a temperature of the heterogeneous catalyst during the regeneration cycle; wherein the regeneration temperature is from about 250° C. to about 1,000° C.; wherein the regeneration pressure is from about 2 torr to about 20 atm; and wherein the regeneration gas comprises oxygen.

Aspect 122. The process of Aspect 121, wherein the regeneration gas comprises oxygen and a second gas, and wherein the second gas is nitrogen, helium, argon, or combinations thereof.

Aspect 123. The process of Aspect 121 or Aspect 122, wherein the regeneration gas comprises about 1 vol % to about 21 vol % oxygen.

Aspect 124. The process of Aspect 123, wherein the regeneration gas comprises about 2 vol % to about 10 vol % oxygen.

Aspect 125. The process of Aspect 123, wherein the regeneration gas comprises about 2 vol % to about 5 vol % oxygen.

Aspect 126. The process of any one of Aspects 121-125, wherein the regeneration temperature is from about 400° C. to about 800° C.

Aspect 127. The process of any one of Aspects 121-125, wherein the regeneration temperature is from about 500° C. to about 700° C.

Aspect 128. The process of any one of Aspects 121-125, wherein the regeneration temperature is from about 500° C. to about 600° C.

Aspect 129. The process of any one of claims 121-128, wherein the regeneration time period is from about 1 hour to about 10 hours.

Aspect 130. The process of any one of Aspects 121-128, wherein the regeneration time period is from about 2 hours to about 6 hours.

Aspect 131. The process of any one of Aspects 121-128, wherein the regeneration time period is from about 3 hours to about 5 hours.

Aspect 132. The process of any one of Aspects 122-131, wherein the regeneration pressure is from about 2 torr to about 10 atm.

Aspect 133. The process of Aspect 132, wherein the regeneration pressure is from about 1 atm to about 5 atm.

Aspect 134. The process of Aspect 132, wherein the regeneration pressure is from about 1 atm to about 2.5 atm.

Aspect 135. The process of Aspect 132, wherein the regeneration pressure is from about 0.7 atm to about 1.5 atm.

Aspect 136. The process of Aspect 132, wherein the regeneration pressure is about the same as ambient pressure.

Aspect 137. A product made by the process of any one of Aspects 1-136.

Aspect 138. The product of Aspect 137, wherein the product is a product gas mixture; and wherein the product gas mixture comprises ammonia and hydrogen.

Aspect 139. The product of Aspect 138, wherein the product gas mixture further comprises at least one higher hydrocarbon.

Aspect 140. The product of Aspect 139, wherein the at least one higher hydrocarbon comprises ethane, ethylene, acetylene, or combinations thereof.

Aspect 141. The product of Aspect 139, wherein the at least one higher hydrocarbon comprises aromatic hydrocarbons comprising a mixture of olefins, benzene, toluene, xylene, C9 or greater aromatic compounds, or combinations thereof.

Aspect 142. The product of any one of Aspects 138-141, further comprising at least one solid carbon material.

Aspect 143. The product of Aspect 142, wherein the solid carbon material forms in contact with the heterogeneous catalyst.

Aspect 144. The product of Aspect 142 or Aspect 143, wherein the solid carbon material comprises carbon nanotubes, carbon fibers, or mixtures thereof.

Aspect 145. The product of Aspect 144, wherein the carbon nanotubes comprise tip growth carbon nanotubes, base growth carbon nanotubes, or mixtures thereof.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

As discussed herein above, there is a significant demand for high selectivity of $CH_4/N_2$ ammonia synthesis under atmospheric pressure that has not been previously solved. Herein, are specific examples of using a microwave-assisted catalytic reactor system carry out this highly desirable reaction between these two stable molecules, $CH_4$ and $N_2$. In various aspects, the exemplary processes demonstrate the ability to synthesize ammonia directly from methane and nitrogen, and simultaneously produce valuable byproducts, including C2-C4 hydrocarbons, including alkanes, alkenes, and alkynes; hydrogen; and crystalline carbon nanotubes. The concomitant production of the foregoing byproducts can increase the process economy. In an exemplary aspect, cobalt and cobalt-iron supported on gamma alumina ($\gamma\text{-}Al_2O_3$) catalysts were used, although other catalysts as disclosed herein above can also be used. In another exemplary aspect, ruthenium-potassium and ruthenium-cobalt-potassium supported on $\gamma\text{-}Al_2O_3$ were prepared and used in the conversion of $CH_4$ and $N_2$ to ammonia, ethane, ethylene, and acetylene. In still another exemplary aspect, a mixed system of ruthenium-potassium supported on $\gamma\text{-}Al_2O_3$ and cobalt supported on $\gamma\text{-}Al_2O_3$ was prepared and used in the conversion of $CH_4$ and $N_2$ to ammonia, ethane, ethylene, and acetylene. It was observed that the catalyst support, $\gamma\text{-}Al_2O_3$, has is particularly suited to optimal absorption of microwave energy. The simplified diagram that represents microwave reaction system used in the examples herein is shown in FIG. 1.

Example 1. Experimental Methods

Catalyst Preparation. The cobalt doped catalyst containing 5 wt % of cobalt was prepared by incipient wetness technique. Gamma phase aluminum oxide was used as a support for the catalyst synthesis. The aluminum oxide support was obtained from Alfa Aesar. The support was impregnated with a cobalt (II) nitrate hexahydrate aqueous solution and dried in an oven at 110° C. for 12 h, and then calcined in air at 500° C. for 4 h. For the cobalt catalyst comprising a promoter metal, the catalyst composition comprised 0.5 wt % Fe and 4.5 wt % Co. This catalyst was prepared by similar methods comprising impregnation with a mixture of cobalt (II) nitrate hexahydrate and iron nitrate nonahydrate aqueous solution. The material was dried and calcined under similar conditions. The cobalt salt and iron salt were obtained from Acros Organics.

Similarly, a 1% $K_2O$-4% Ru—$Al_2O_3$ catalyst was prepared using the incipient wetness technique described above using potassium and ruthenium salts such as potassium and ruthenium nitrates. Furthermore, a 1% $K_2O$-4% Ru-5% Co/γ-$Al_2O_3$ catalyst was prepared by co-impregnating ruthenium, potassium, and cobalt using the incipient wetness technique, using potassium, cobalt, and ruthenium salts as precursors. In some instances, a cobalt catalyst supported on γ-$Al_2O_3$ was physically mixed with a potassium-ruthenium catalyst supported on γ-$Al_2O_3$; both catalysts were prepared as described above. In the foregoing formulas, e.g., a percentage value indicates a weight percent amount.

Figure 7:
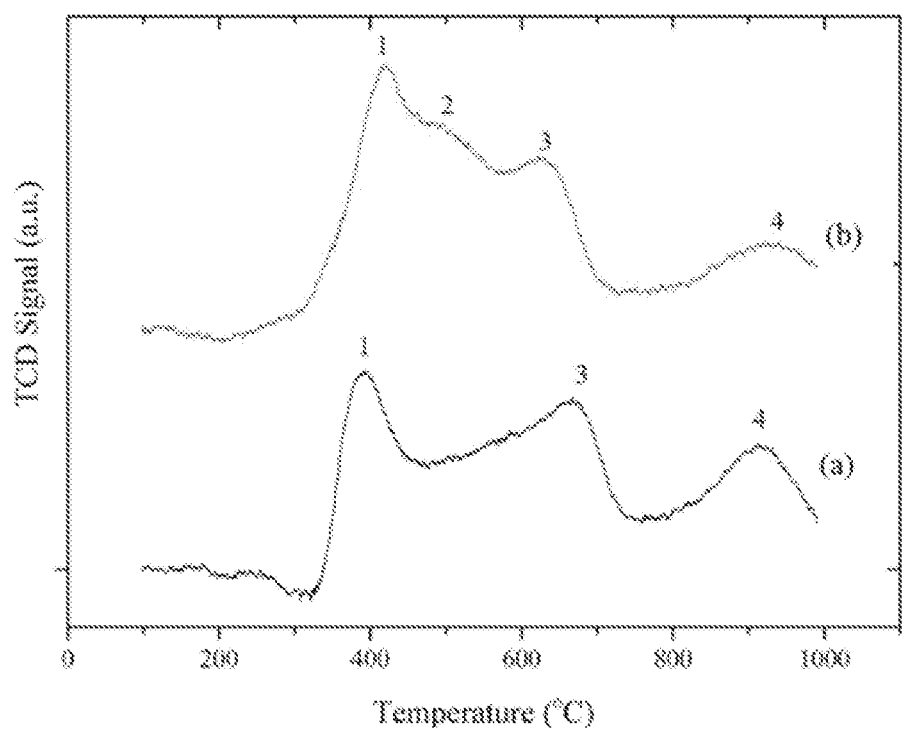
FIG. 7 shows representative temperature programmed reduction ("TPR") analysis profiles for two disclosed catalysts. The data were collected using a thermoconductivity (TCD) detector track hydrogen concentration change in outlet stream. The data shown in the figure are collected from a disclosed Co/γAl$_2$O$_3$ catalyst (line a) and a disclosed Co—Fe/γAl$_2$O$_3$ catalyst (line b).

Microwave Reactor Setup. The experiments were carried out in a 10.5 mm inner-diameter (ID) quartz tube reactor with Lambda MC1330-200 Variable Frequency Microwave controller under atmospheric pressure and continuous flow condition. The frequency was set as 6250 MHz. One gram of catalyst was loaded for each experiment. Prior to the reaction, the catalyst was reduced in 70 mL/min pure hydrogen at 675° C. for 4 hours to ensure maximum reduction to $Co^0$ species. The reduction temperature was selected based on a temperature-programmed-reduction (TPR) analysis shown in FIG. 7. The data in FIG. 7 are further summarized in Table 1 below.

TABLE 1

| Peak identification of TPR profiles.* | | | | |
|---|---|---|---|---|
| Sample | $T_1$ (° C.) | $T_2$ (° C.) | $T_3$ (° C.) | $T_4$ (° C.)* |
| Co/γ$Al_2O_3$ | 392.5 | N/A | 667.5 | 924.1 |
| Co—Fe/γ$Al_2O_3$ | 419.0 | 486.0 | 622.9 | 914.8 |

*$T_4$ stands for the reduction of small metal particles and metal oxide support which strongly adhere to the support surface. Hence, $Co^0$ and $Fe^0$ are obtained when reducing temperature reaches at least 667.5° C.

During the reaction, the overall gas flow rate was adjusted to 120 mL/min. Diluted methane gas mixture (30 vol % methane balanced with nitrogen) was used to enhance the conversion. In the case of microwave plasma generation, 100 mL/min of mixture gas was fed into the system accompanying with 20 mL/min of pure argon flow, and a striker was applied to assist plasma formation. In contrast, other non-thermal plasma, such as Dielectric barrier discharge (DBA), requires a high voltage DC power (10,000 volt). For microwave irradiation only case, argon was replaced with nitrogen at the same flow rate. During the reaction, the catalyst was heated to 600° C. in inert environment before the feed gas was initiated. A solid calcium oxide layer was applied at the outlet stream to remove the potential moisture. For the control experiment conducted in a traditional fixed-bed reactor, the experiment was carried out in a Micromeritics Autochem 2950 analyzer using 0.25 grams of catalyst sample and a total flow rate of the feed gas adjusted to 30 mL/min to maintain the same weight hourly space velocity (WHSV). The outlet gas was monitored by a Pfeiffer Omnistar mass spectrometer and an Agilent 3000A gas chromatography. The temperature of outlet from the reactor was maintained at 120° C.

Microwave Reaction Operation. Lambda MC1330-200 Variable Frequency Microwave Reactor comprised a power supply, a three-stub applicator, a circulator, a rectangular metallic waveguide and a quartz tube reactor. The microwave was generated by the power supply and the applicator was manually adjust for a minimum reflected power. The closed-structure rectangular waveguide couples the microwave energy and homogeneous planar plasma can be generated. The catalyst was located at the point where the electromagnetic field was maximum. For plasma generation, argon was introduced as an "igniter" and an electric striker was applied to assist self-sustained microwave plasma ignition. Microwave irradiation was applied during the whole experiment period and the plasma was sustained during the entire experiment.

Process Characterization—TPR Analysis. The TPR analysis of fresh and calcinated catalyst was carried out in a Micromeritics Autochem 2950 analyzer using 10 vol % of hydrogen in argon. A thermoconductivity (TCD) detector was used to track the signal which reflects the hydrogen concentration change in outlet stream. The catalyst sample was heated to 150° C. to remove the moisture, after which the temperature was programmed to 1000° C. at a rate of 2° C./min.

Process Characterization—Raman Spectroscopy. Carbon composition present on spent catalysts was analyzed by Raman spectrum of each sample. Raman spectra were obtained from a Renishaw in via Raman Spectrometer using laser excitation at wavelength of 523 nm. \

Process Characterization—TGA Analysis. Thermogravimetric analysis (TGA) under oxygen was applied to quantify the coking amount and it was performed in TA SDT-650 Discovery model instrument. Oxygen concentration was 5 vol % in Helium.

Process Characterization—TEM Analysis. A JEOL TEM-2100 transmission electron microscope (TEM) was applied to observe carbon structures of spent catalyst samples under 400,000 times magnification.

Calculations. The productions of all products from this microwave catalytic reaction are evaluated by the amount of moles of products obtained per gram catalyst per second (mol/g/s). The mole number was obtained by ideal gas law. Pressure is atmospheric pressure and the temperature is outlet temperature which was maintained at 150° C. during all experiments. Total ammonia production during the experiment was evaluated by integrating production curves.

Example 2. Results

Cobalt Catalysts

Figure 2A:
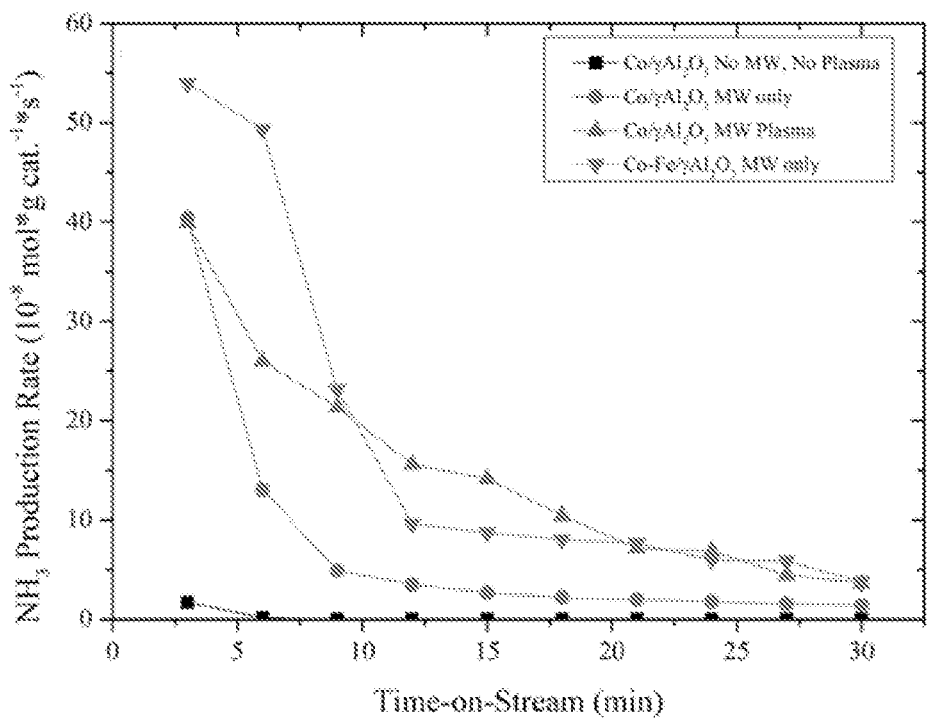
FIGS. 2A-2B show representative data for a disclosed method pertaining to ammonia production and conversion efficiency of methane.
Figure 2B:
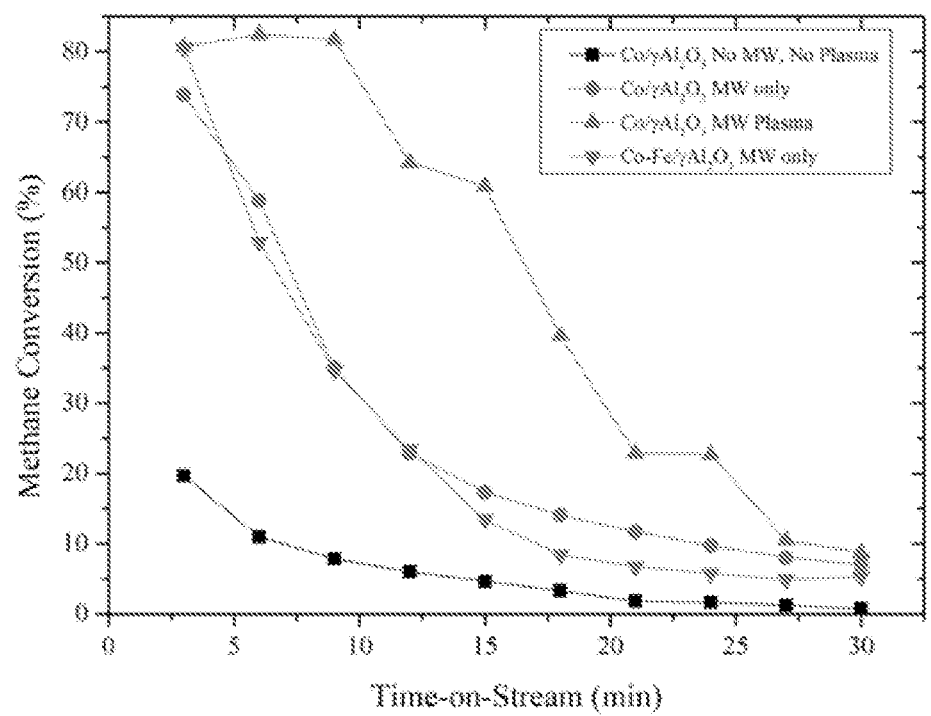
Figure 4:
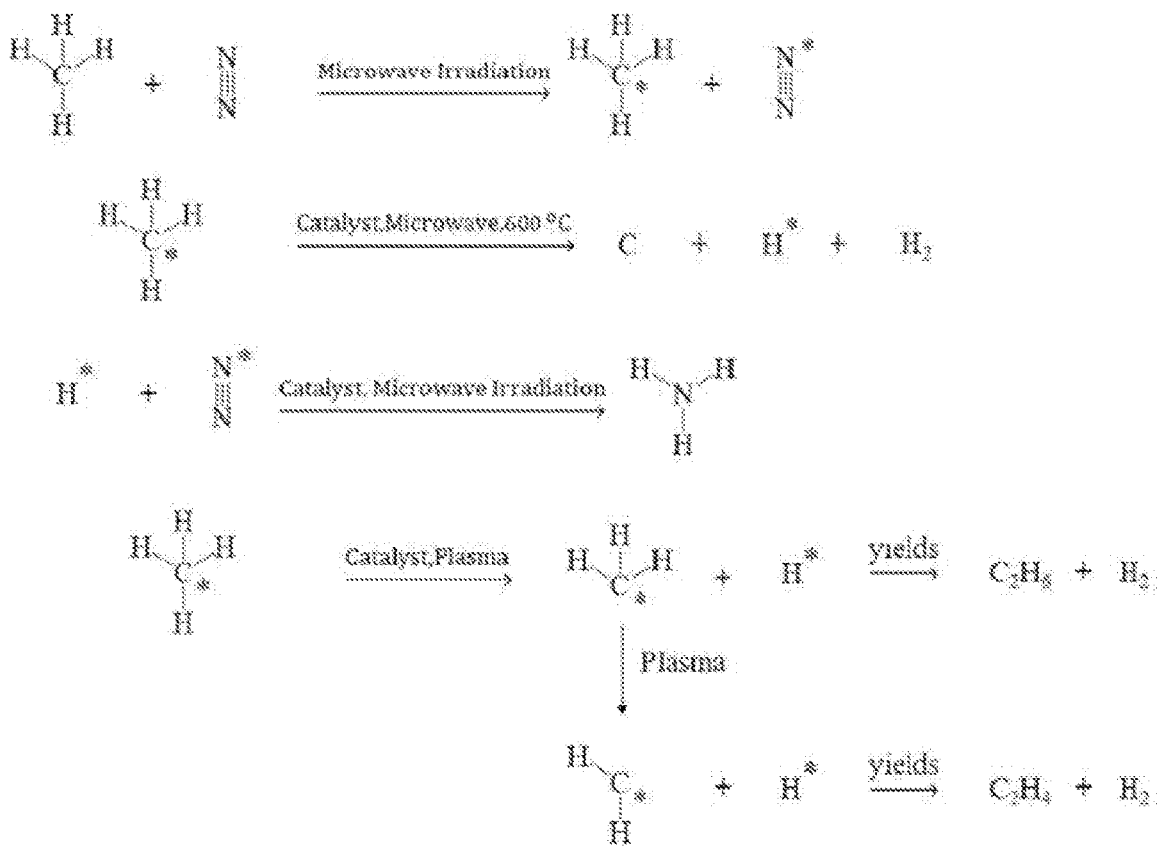
FIG. 4 shows a representative scheme of possible reaction mechanisms that the reactants can undergo in the disclosed methods.
Figure 5:
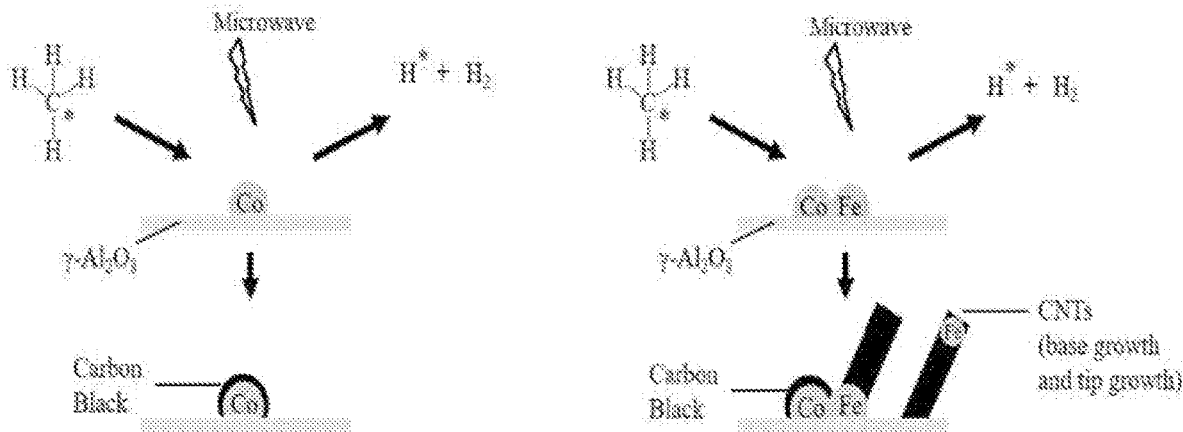
FIG. 5 shows a representative scheme for the formation of different intermediate carbon species on a disclosed catalyst.

FIGS. 2A-2B show representative reaction performance for the process. The reaction was carried out at 600° C. and 1 atm for the data shown, with a weight hourly space velocity of 120 CCM per gram catalyst. As shown in FIG. 2A, when Co/γ$Al_2O_3$ was used as a catalyst operated under conventional heating conditions, the ammonia production rate was only $1.7*10^{-8}$ mol/g/s with the maximum methane conversion being 19.7%. Upon applying microwave irradiation, ammonia production and methane conversion were enhanced significantly, and reached to $40.8*10^{-8}$ mol/g/s and 73.8%, respectively. By calculating the total $NH_3$ production during the 30 minutes reaction period, it was observed that $NH_3$ production under microwave plasma condition was 143.5% ($383.1*10^{-8}$ mol) higher than applying microwave irradiation only ($157.3*10^{-8}$ mol). By comparing these results using Co/γ$Al_2O_3$ as catalyst, it was observed that microwave accelerates the chemical reaction rate, enhancing ammonia yield and methane conversion compared with a conventional fixed-bed process. Under conditions wherein microwave irradiation generates plasma from reactant feedstock, i.e., methane and nitrogen, ammonia yield was further increased.

Figure 6:
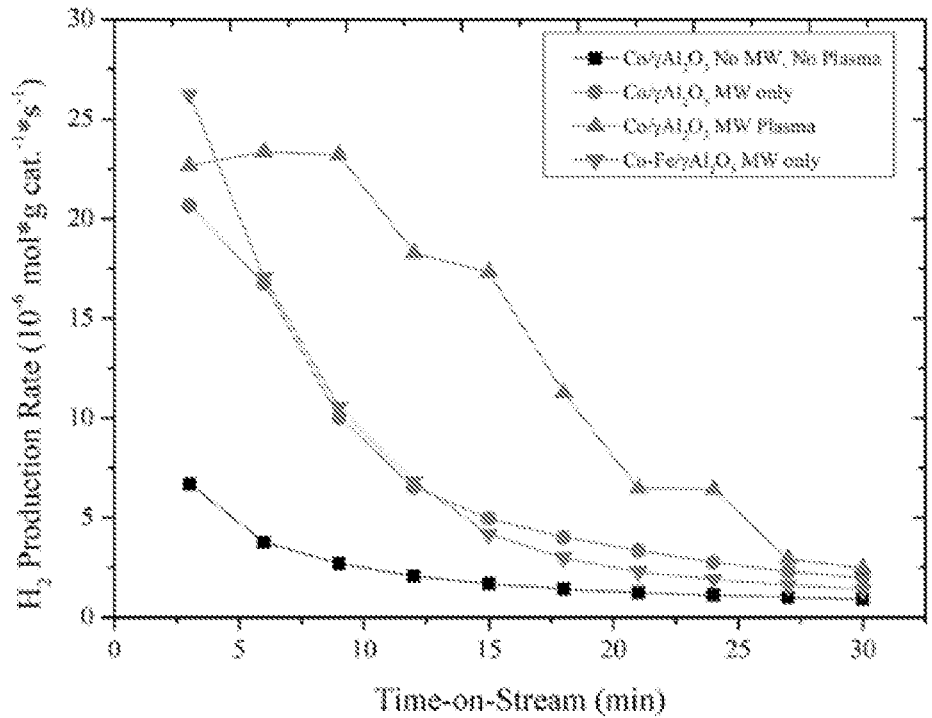
FIG. 6 shows representative data for hydrogen production versus time-on-stream for various disclosed catalysts. As shown on the y-axis, production is given in $10^{-6}$ mol H$_2$ per gram catalyst per second ($10^{-6}$ mol/g/s).
Figure 8A:
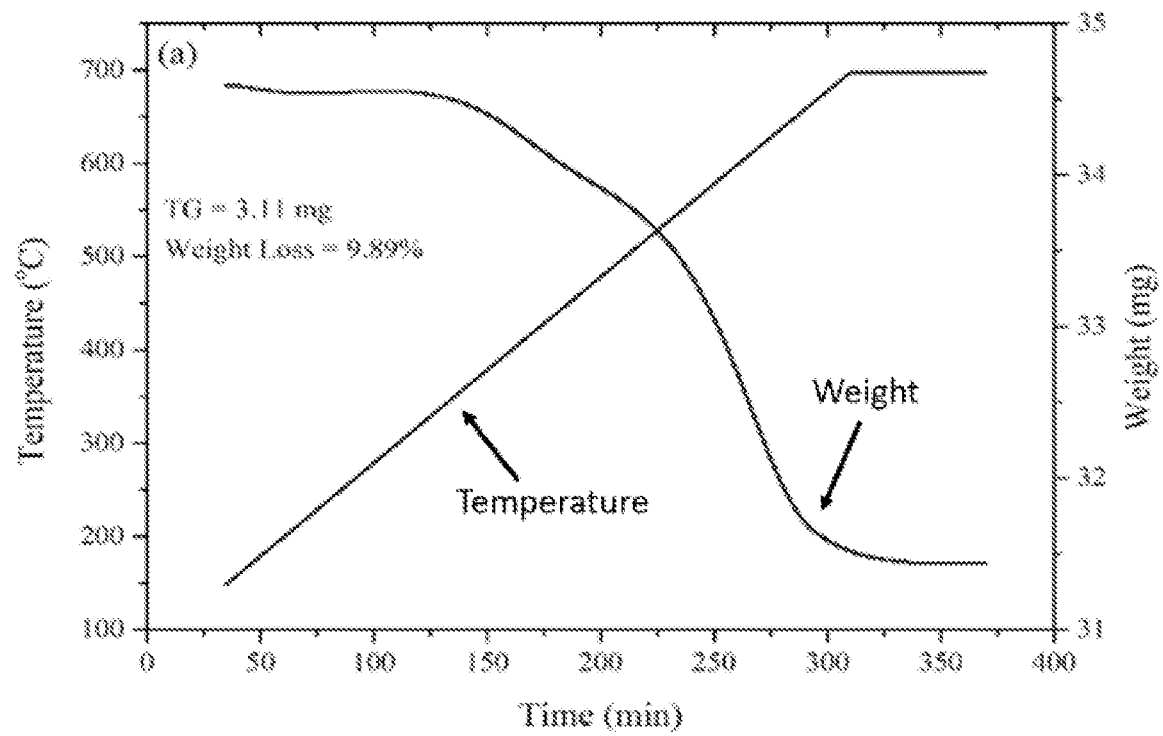
FIGS. 8A-8C show representative data for obtained from thermogravimetric analysis (TGA) under oxygen versus time for a disclosed spent catalyst in order to quantify the coking levels over time in a disclosed process.
Figure 8B:
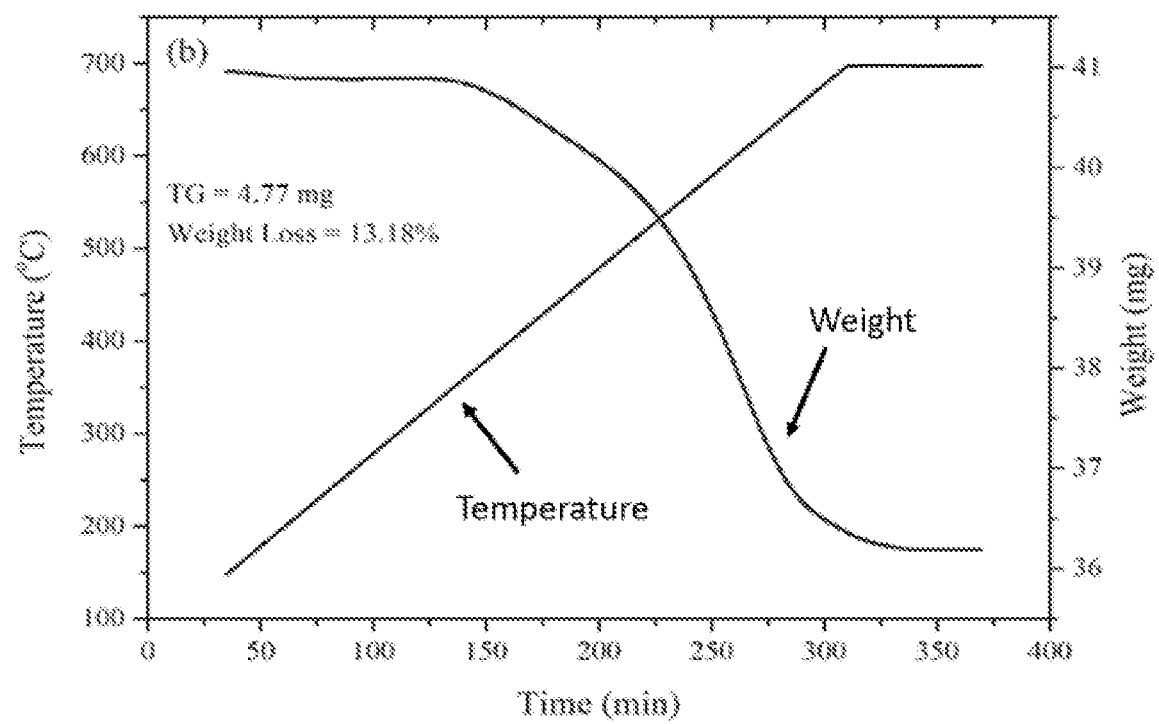
Figure 8C:
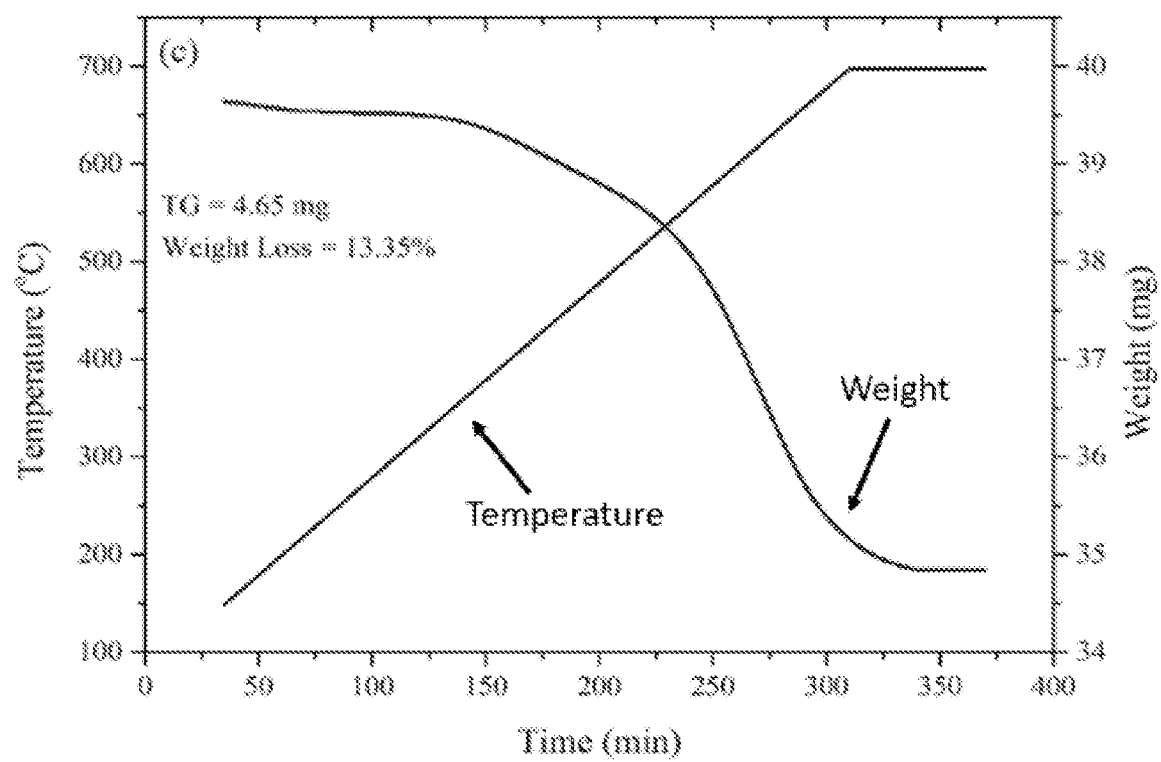
Figures 10A, 10B:
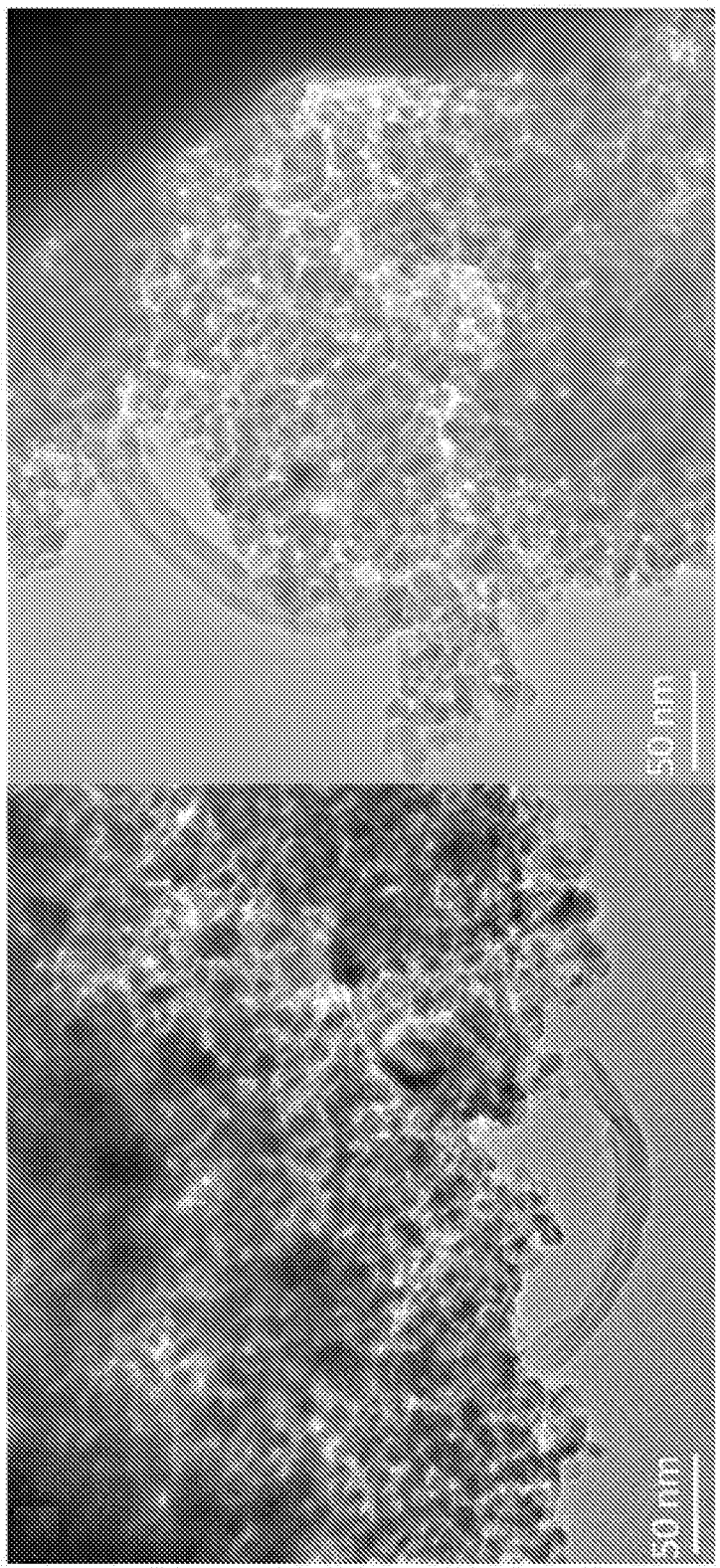
FIGS. 10A-10B show representative transmission electron microscropy ("TEM") images of coke deposits on a spent disclosed catalyst, Co/γAl$_2$O$_3$.

Data were collected that demonstrates the production of a high concentration of hydrogen at the reactor outlet (FIG. 6), suggesting that concomitant carbon formation was likely significant in this reaction. The data in FIGS. 2A-2B suggest that the accumulation of carbon deposit directly can inhibit the ammonia production and methane conversion. Without wishing to be bound by a particular theory, it is possible that since the microwave irradiation and/or microwave plasma were sustained during the reaction period, the decrease of ammonia production and methane conversion are illustrative of the catalyst role in carbon formation. TGA analysis in FIGS. 8A-8C are consistent with the carbon formation on the catalyst. Moreover, TEM images show the formation of a coke deposits on the catalyst (FIGS. 10A-10B).

Figure 9:
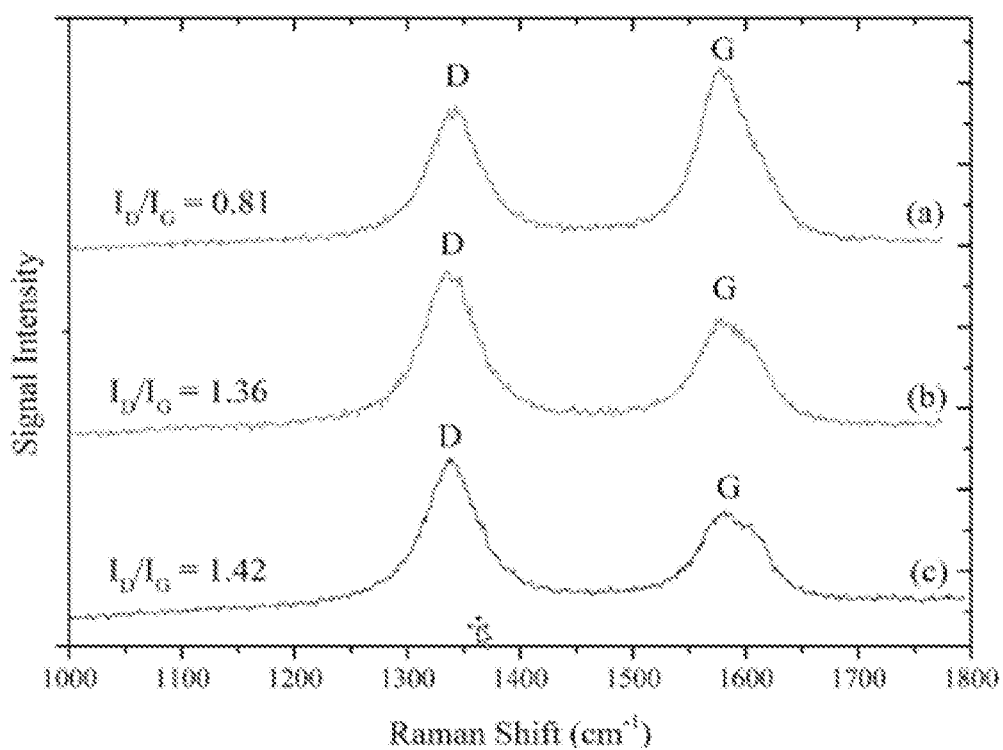
FIG. 9 shows representative Raman spectra data for various spent catalysts obtained after reaction. Raman spectra is used to characterize the crystallinity of coke formed on the catalyst surface. Line (a) shows Raman data for a spent Co—Fe/γAl$_2$O$_3$ catalyst in a reaction carried out under microwave plasma. Line (b) shows Raman data for a spent Co/γAl$_2$O$_3$ catalyst in a reaction carried out under microwave plasma. Line (c) shows Raman spectra for a spent Co/γAl$_2$O$_3$ catalyst in a reaction carried out under microwave irradiation only, without generating plasma.

According to Raman analysis, the carbon deposit on Co/γAl$_2$O$_3$ was observed to be mainly low quality amorphous carbon (high $I_D/I_G$ value, see FIG. 9). The disclosed process can be further improved using disclosed regeneration and decoking methods. In order to assess whether a metal promoter could facilitate production of higher value carbon products such as carbon nanotubes (CNTs), catalysts comprising an exemplary promoter metal such as iron were prepared. In the exemplary studies herein, an iron promoter (0.5 wt %) was introduced onto Co/γAl$_2$O$_3$ catalyst, and the catalyst was evaluated for the direct conversion of methane and nitrogen. As shown in FIG. 9, the observed $I_D/I_G$ value in Raman spectra was improved in the presence of a catalyst comprising a promoter metal. The TEM images in FIGS. 3A-3B confirm the formation carbon nanotubes. Meanwhile, it was observed that the maximum ammonia production rate reached to $53.9*10^{-8}$ mol/g/s and total ammonia production was $441.5*10^{-8}$ mol in the presence of a catalyst comprising a promoter metal, which was 180.7% higher than that of non-promoted cobalt catalyst under same reaction condition of microwave irradiation only (FIG. 2A).

Effects of Plasma Formation and Metal Promoter

The disclosed process integrates system elements of electromagnetic sensitive catalysts and microwave reactor to provide a system to convert methane and nitrogen to value added products. The data herein indicate that stable molecules such as CH$_4$ and N$_2$ can be activated by microwave irradiation at appropriate reaction conditions to produce NH$_3$. Moreover, the data herein show that the conversion of CH$_4$ and the yield of NH$_3$ can be further enhanced in the presence of microwave plasma. In addition, a metal promoter can provide further enhanced ammonia yield. Also, the disclosed processes are demonstrated herein to provide value-added products, such as carbon nanotubes.

TABLE 2

Catalyst performance summary.

| Catalyst | Reaction Condition | Maximum NH$_3$ Production Rate* ($10^{-8}$ mol/g/s) | Total NH$_3$ Production for 30 minutes ($10^{-8}$ mol) | Maximum Methane Conversion |
|---|---|---|---|---|
| Co/γ-Al$_2$O$_3$ | Traditional Heating | 1.7 | 3.0 | 19.7% |
| Co/γ-Al$_2$O$_3$ | Microwave Irradiation Only | 40.8 | 157.3 | 73.8% |
| Co/γ-Al$_2$O$_3$ | Microwave Irradiation and Microwave Plasma | 39.9 | 383.1 | 80.7% |
| Co—Fe/γ-Al$_2$O$_3$ | Microwave Irradiation Only | 53.9 | 441.5 | 80.6% |

Ruthenium with a Promoter

Figure 11A:
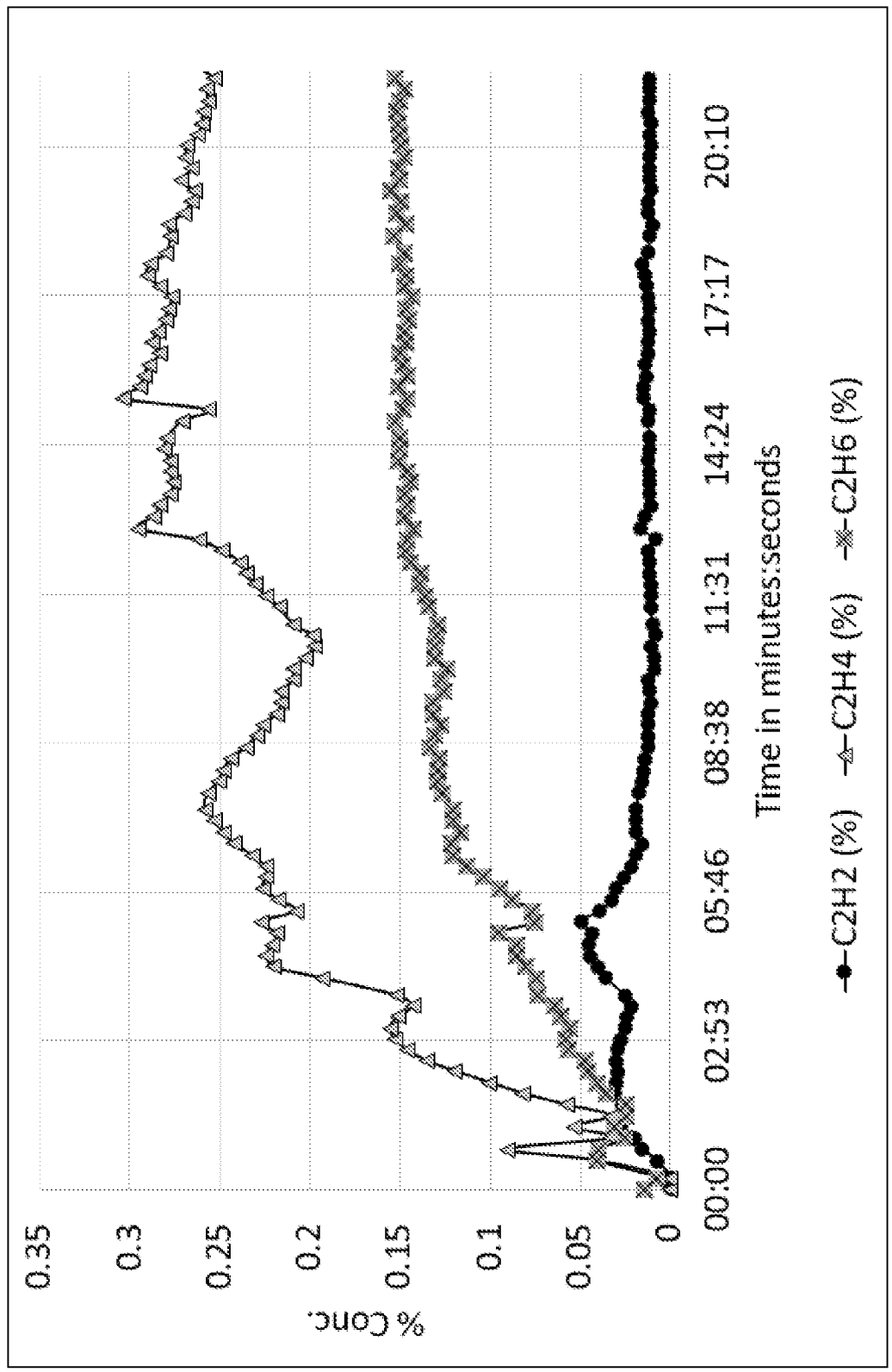
FIGS. 11A-11B show formation of acetylene, ethylene, ethane, and ammonia from the reaction of methane with nitrogen under microwave irradiation over 1% K$_2$O-4% Ru—Al$_2$O$_3$ catalyst (0.1 MPa, 600° C.).
Figure 11B:
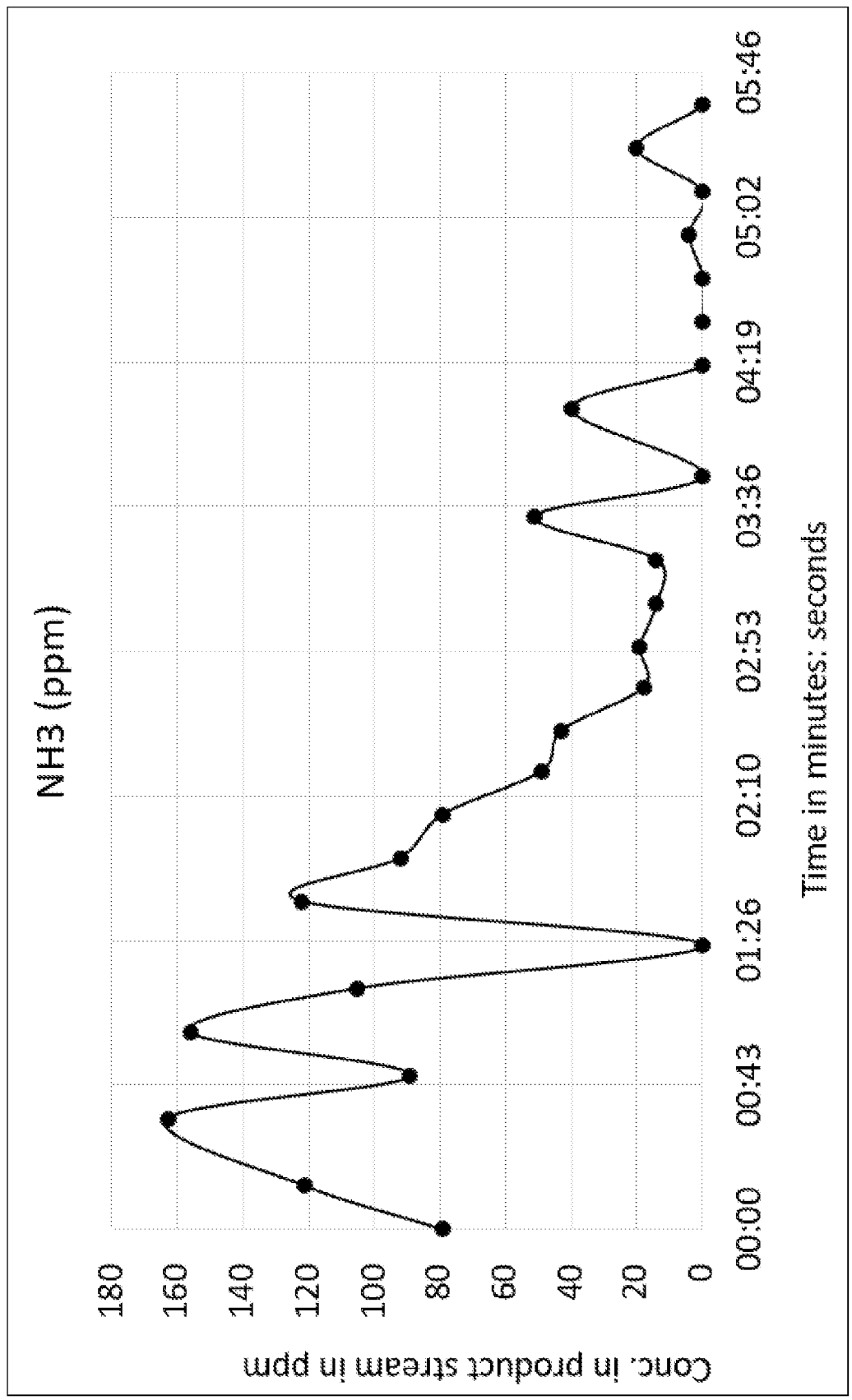

In some experiments, a 1% K$_2$O-4% Ru/γ-Al$_2$O$_3$ catalyst was used to produce ammonia, ethane, ethylene, and acetylene from a mixture of methane and nitrogen under microwave irradiation as described previously. Experiments were conducted at 0.1 MPa of pressure and 600° C. (FIGS. 11A-11B). Ruthenium-containing catalysts can thus catalyze C—C bond formation in addition to ammonia synthesis.

Mixed Heterogeneous Catalyst

Figure 12A:
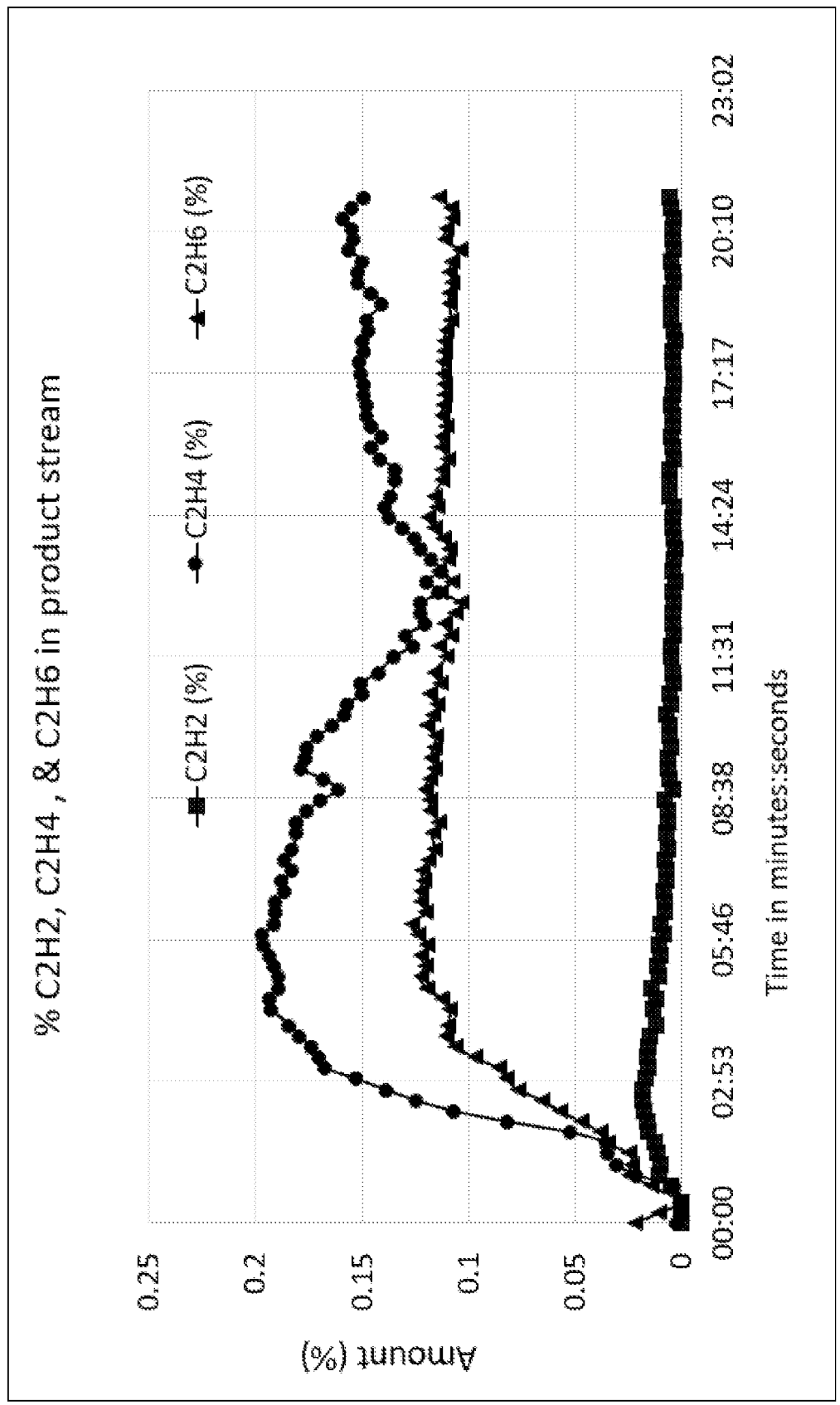
FIGS. 12A-12B show formation of acetylene, ethylene, ethane, and nitrogen from the reaction of methane with nitrogen under microwave irradiation over 1% K$_2$O-4% Ru—Al$_2$O$_3$ and Co/Al$_2$O$_3$ catalyst (0.1 MPa, 600° C.).
Figure 12B:
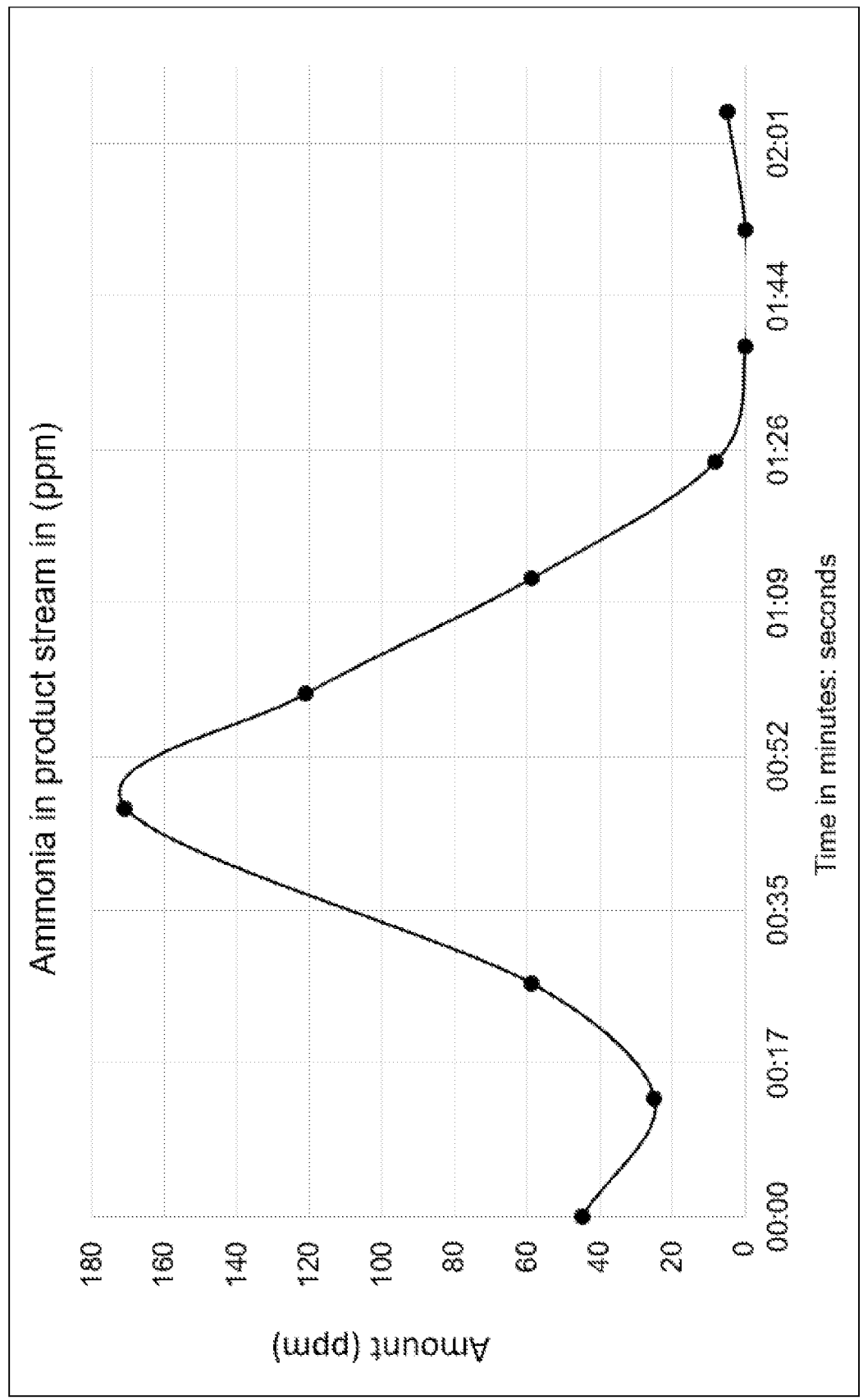
Figure 13A:
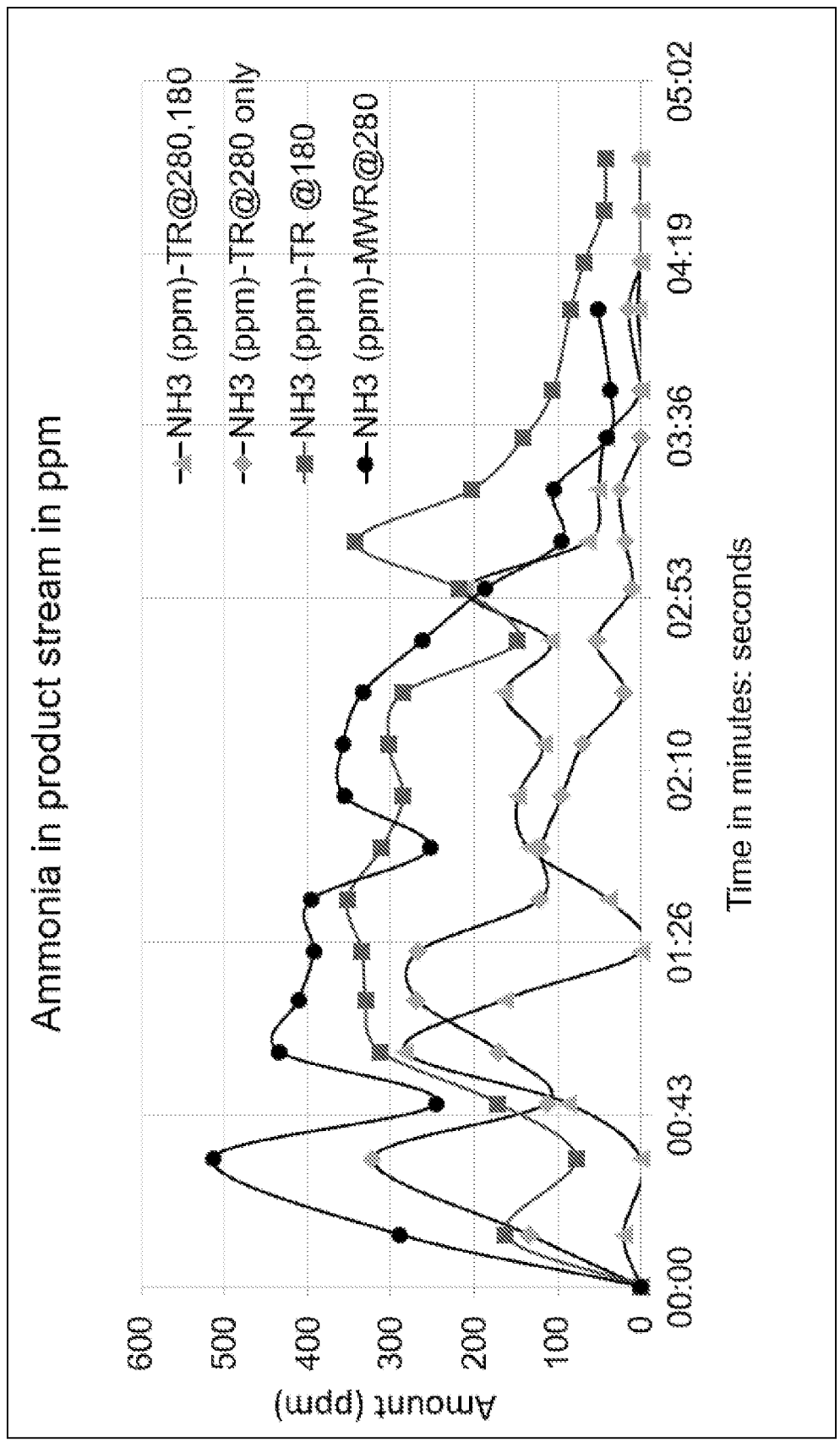
FIGS. 13A-13D show formation of ammonia, ethylene, acetylene, and ethane from the reaction of methane with nitrogen under microwave irradiation over 1% K$_2$O-4% Ru-5% Co—Al$_2$O$_3$ catalyst, pre-reduced under different conditions, where TR=thermally reduced, MWR=reduced under microwave heating, and numbers in legends refer to temperatures used during pre-reduction. Following pre-reduction, the reaction was carried out at 0.1 MPa and 600° C.
Figure 13B:
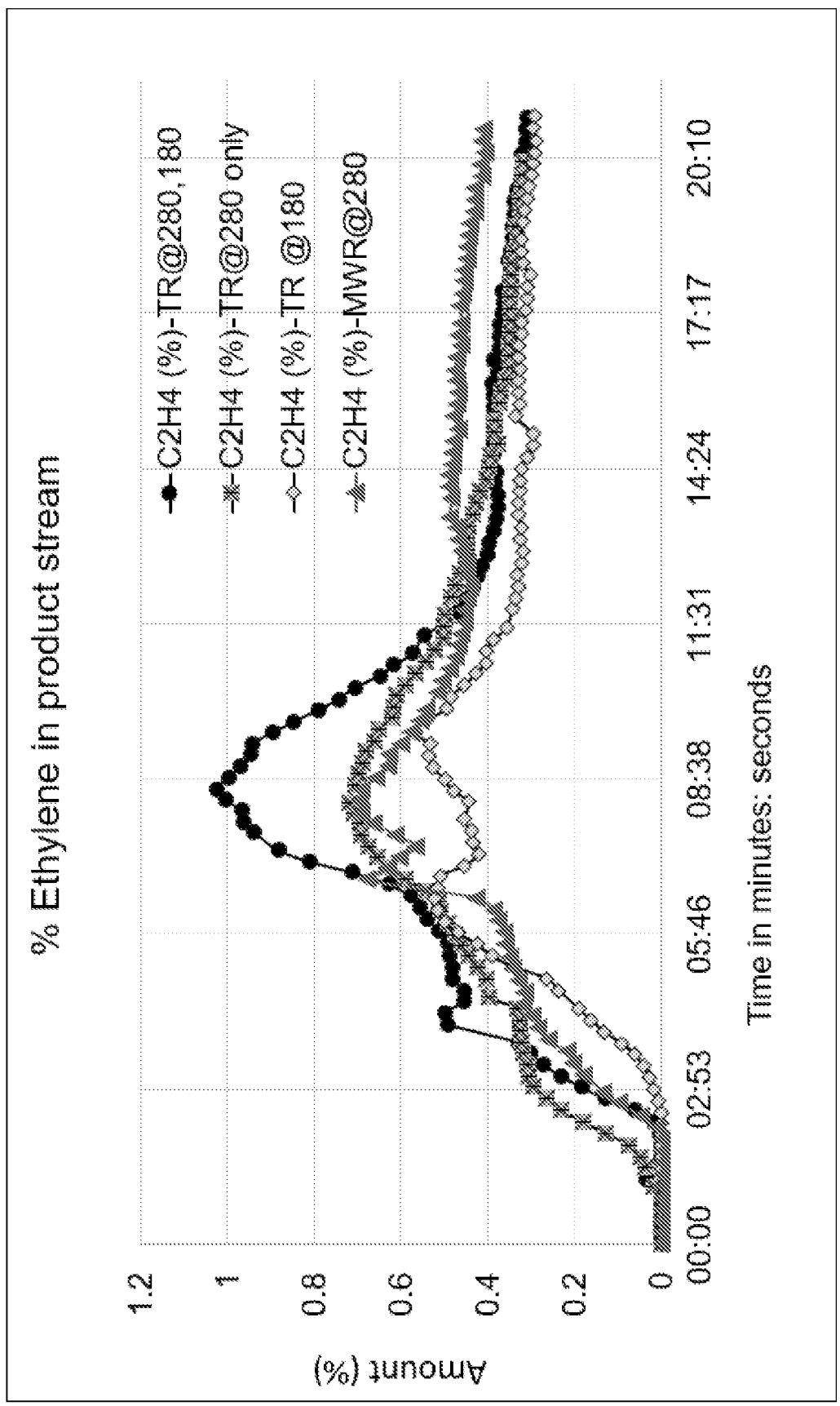
Figure 13C:
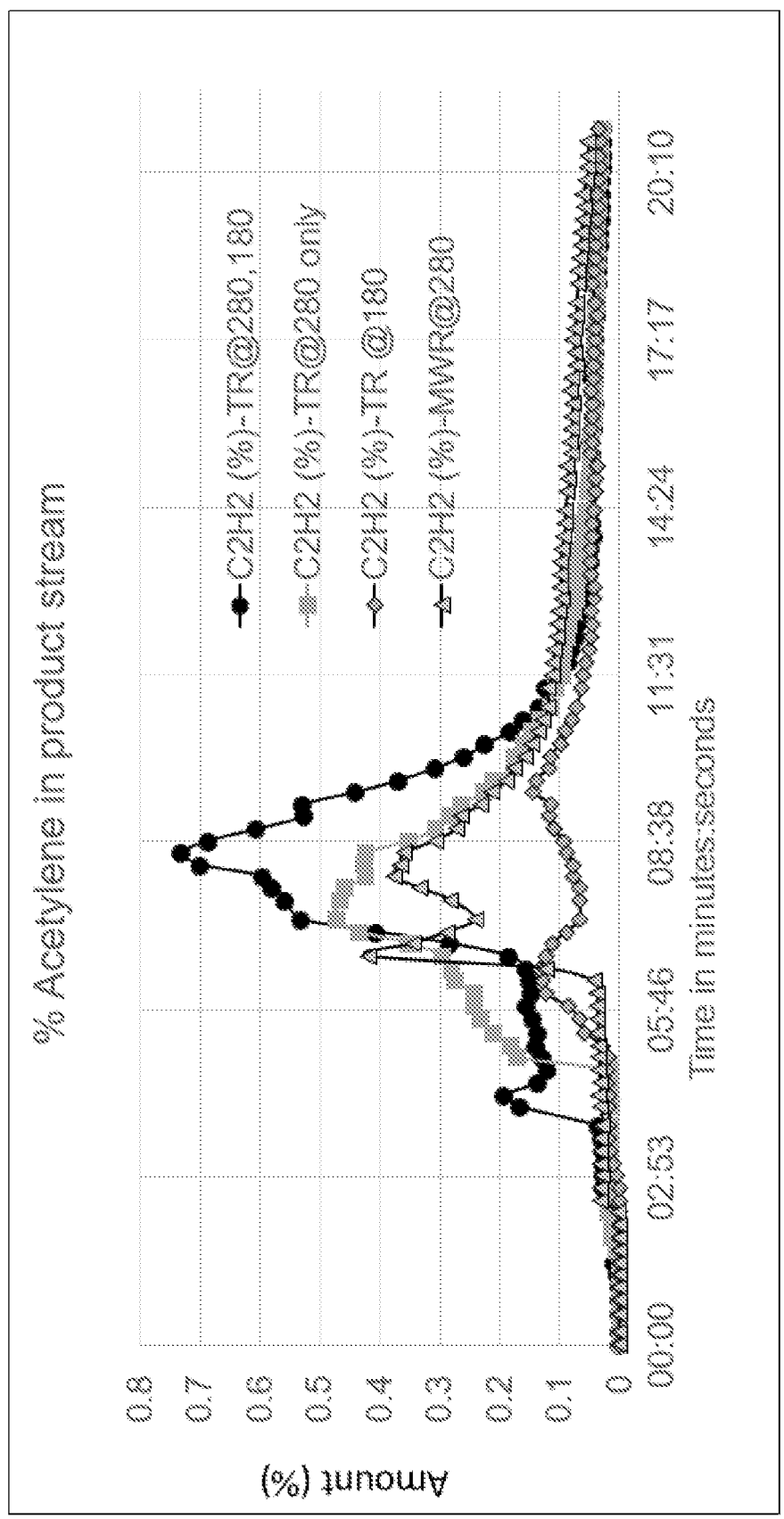
Figure 13D:
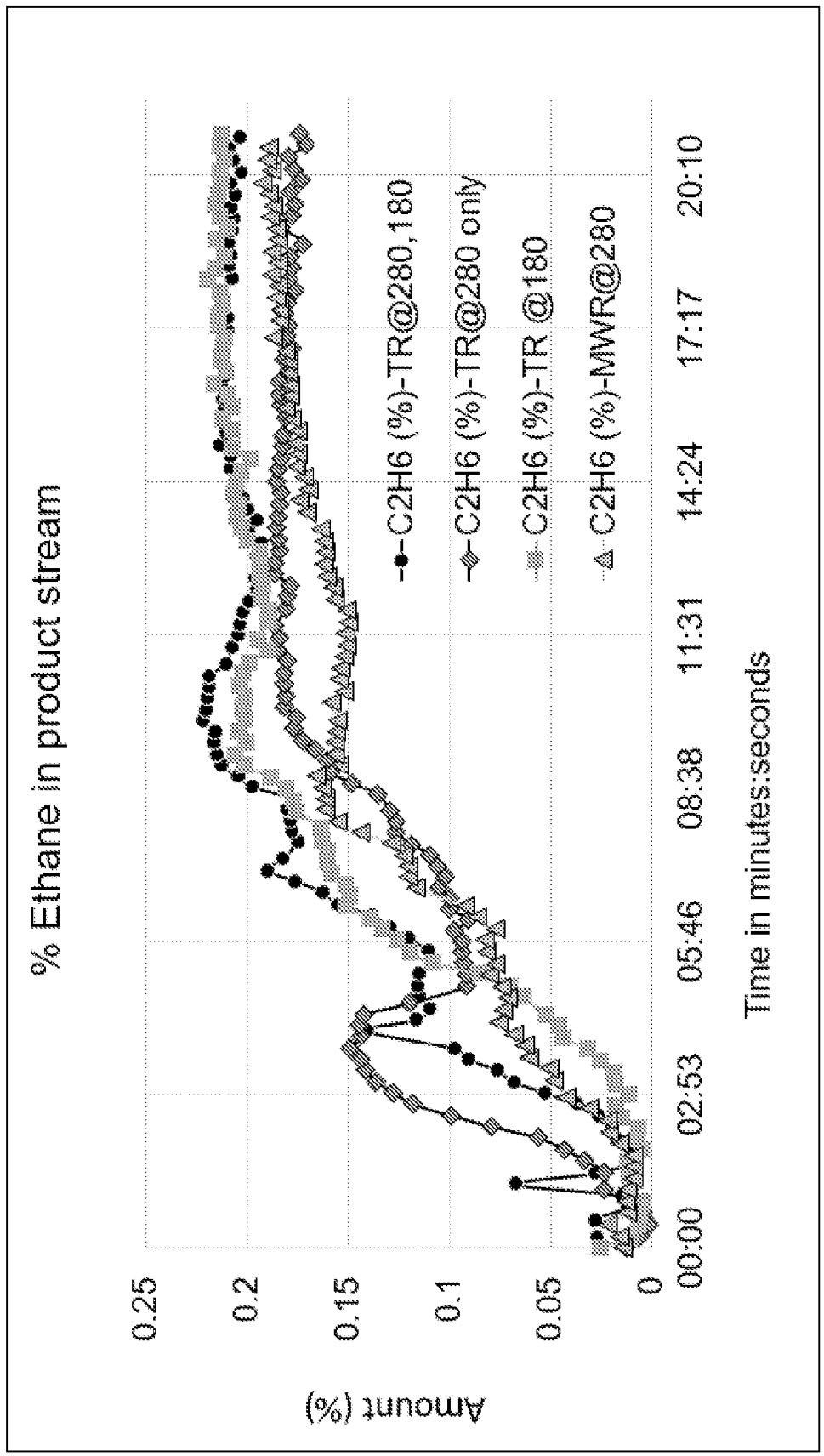

In some experiments, a mixed catalyst was used. A 1% K$_2$O-4% Ru/γ-Al$_2$O$_3$ catalyst was prepared and, separately, a 5% Co/γ-Al$_2$O$_3$ catalyst was prepared as described herein above. The two catalysts were physically mixed together in a 1:1 ratio by weight (total weight: 0.5 gram) and used to produce ammonia, ethane, ethylene, and acetylene from a mixture of methane and nitrogen under microwave irradiation as described previously. In this study, the feedstock gas of methane and nitrogen was at a ratio of CH$_4$/N$_2$ of 3:1 and supplied at a rate of 100 mL/min. Experiments were conducted at 0.1 MPa of pressure and 600° C. (FIGS. 12A-12B). Mixed catalysts can thus catalyze C—C bond formation in addition to ammonia synthesis.

Bimetallic Catalysts

In some experiments, a bimetallic catalyst was used. A 1% K$_2$O-4% Ru-5% Co/γ-Al$_2$O$_3$ catalyst was prepared and used to produce ammonia, ethane, ethylene, and acetylene from a mixture of methane and nitrogen under microwave irradiation as described previously. Experiments were conducted at 0.1 MPa of pressure and 600° C. (FIGS. 13A-13D). In these experiments, the catalyst was pre-reduced under four different sets of conditions: thermal reduction at 280° C. followed by thermal reduction at 180° C.; thermal reduction at 280° C. only; thermal reduction at 180° C. only; and microwave reduction at 280° C. Bimetallic catalysts containing both ruthenium and cobalt can thus catalyze C—C bond formation in addition to ammonia synthesis.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A process for synthesizing ammonia, comprising:
   providing a reaction chamber with a heterogeneous catalyst;
      wherein the heterogeneous catalyst comprises a metal selected from the group consisting of Group 7, Group 8, Group 9, Group 10, Group 11, and combinations thereof; wherein the metal is present in an amount from about 0.1 wt % to about 20 wt % based on the total weight of the heterogeneous catalyst; and a metal oxide support;
      wherein the reaction chamber is a microwave-assisted reactor system operated under reaction pressure of about 2 torr to about 20 atm;
   conveying a flow of a reactant gas mixture into the reaction chamber via an entry port;
      wherein the reactant gas mixture comprises nitrogen and at least one C1-C4 hydrocarbon;
   contacting the reactant gas mixture and the heterogeneous catalyst;
   heating the heterogeneous catalyst using microwave energy, thereby providing a product gas mixture;

wherein the product gas mixture comprises ammonia, C2-C4 hydrocarbons, aromatics and hydrogen; and conveying the product gas mixture from the reaction chamber via an exit port.

2. The process of claim 1, wherein the metal is selected from the group consisting of ruthenium, cobalt, rhodium, palladium, osmium, iridium, platinum, cobalt, manganese, and combinations thereof.

3. The process of claim 1, further comprising providing the reaction chamber with a second heterogeneous catalyst; wherein the second heterogeneous catalyst comprises a second metal selected from the group consisting of Group 7, Group 8, Group 9, Group 10, Group 11, and combinations thereof; wherein the second metal is present in an amount of from about 0.1 wt % to about 20 wt % based on the total weight of the second heterogeneous catalyst; and a metal oxide support; and wherein the heterogeneous catalyst and the second heterogeneous catalyst are physically mixed together prior to beginning the process.

4. The process of claim 1, wherein the metal oxide support comprises MgO, $Al_2O_3$, $SiO_2$, $TiO_2$, $ZrO_2$, $HfO_2$, zeolite, or combinations thereof.

5. The process of claim 1, wherein the heterogeneous catalyst further comprises a promoter metal present in an amount of about 0.1 wt % to about 5 wt % based on the total weight of the heterogeneous catalyst; wherein the promoter metal is selected from the group consisting of Group 1, Group 2, Group 7, Group 8, Group 9, Group 10, Group 11, oxides thereof, and combinations thereof; and wherein the promoter metal is not the same as the metal of the heterogeneous catalyst.

6. The process of claim 5, wherein the promoter metal is iron (Fe) or potassium (K), or Caesium (Cs).

7. The process of claim 1, wherein the C1-C4 hydrocarbon comprises methane, ethane, propane, butane, or combinations thereof.

8. The process of claim 1, wherein the heating the reaction chamber using microwave irradiation without generating plasma to activate nitrogen and at least one C1-C4 hydrocarbons.

9. The process of claim 1, wherein the heating the reaction chamber using microwave energy induces plasma formation and wherein plasma formation induces ionization of nitrogen, the at least one C1-C4 hydrocarbon, or both.

10. The process of claim 1, wherein the process has a single pass methane conversion of about 3 vol % to about 100 vol %.

11. The process of claim 1, further comprising reducing the heterogeneous catalyst prior to providing the reaction chamber with the heterogeneous catalyst and wherein the reducing the heterogeneous catalyst comprises conveying a flow of a first reducing gas comprising H2 such that the first reducing gas comprising H2 contacts the heterogeneous catalyst; and heating the heterogeneous catalyst at a first catalyst reducing temperature from about 100° C. to about 1,000° C.

12. The process of claim 1, further comprising pre-heating the reactant gas mixture to a reactant gas mixture pre-heat temperature prior to conveying the flow of a reactant gas mixture into the reaction chamber via an entry port; and wherein the reactant gas mixture pre-heat temperature is from about 20° C. to about 1000° C.

13. The process of claim 1, wherein the process is carried out in the reactor chamber configured as batch, or fixed-bed continuous flow, or moving-bed mode with a residence time of the reactant gas mixture in the reaction chamber of from about 0.01 minute to about 3 hours.

14. The process of claim 1, further comprising a regeneration cycle comprising terminating the flow of reactant gas and providing a regeneration gas to the catalyst bed; wherein the regeneration gas is in contact with the catalyst bed for a regeneration time period at regeneration temperature and a regeneration pressure; wherein the regeneration time period is from about 15 minutes to about 20 hours; wherein the regeneration temperature is a temperature of the heterogeneous catalyst during the regeneration cycle; wherein the regeneration temperature is from about 250° C. to about 1,000° C.; wherein the regeneration pressure is from about 2 torr to about 20 atm; and wherein the regeneration gas comprises oxygen.

15. The process of claim 14, wherein the regeneration gas comprises about 1 vol % to about 21 vol % oxygen and a second gas, and wherein the second gas is nitrogen, helium, argon, or combinations thereof.

16. The process of claim 14, wherein the regeneration temperature is from about 400° C. to about 800° C., the regeneration time period is from about 1 hour to about 10 hours, and the regeneration pressure is from about 2 torr to about 10 atm.

* * * * *